(12) United States Patent
Sugaya

(10) Patent No.: US 7,295,780 B2
(45) Date of Patent: Nov. 13, 2007

(54) APPARATUS FOR DETECTING PEAKS OF WAVELENGTH-DIVISION-MULTIPLEXED LIGHT, AND APPARATUS FOR CONTROLLING SAID LIGHT

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 10/807,287

(22) Filed: Mar. 24, 2004

(65) Prior Publication Data

US 2004/0175180 A1 Sep. 9, 2004

Related U.S. Application Data

(62) Division of application No. 09/441,080, filed on Nov. 16, 1999, now Pat. No. 6,873,795.

(30) Foreign Application Priority Data

Dec. 18, 1998 (JP) .................................. 10-360078

(51) Int. Cl.
*H04J 14/02* (2006.01)
(52) U.S. Cl. .............................. 398/97; 398/62; 398/64
(58) Field of Classification Search .................. 398/18, 398/33–34, 38, 62, 64, 97, 160
See application file for complete search history.

(56) References Cited

U.S. PATENT DOCUMENTS

| | | | | |
|---|---|---|---|---|
| 4,726,644 A | * | 2/1988 | Mathis | 385/24 |
| 5,002,349 A | | 3/1991 | Cheung et al. | 385/1 |
| 5,675,432 A | | 10/1997 | Kosaka | 359/341 |
| 5,801,861 A | | 9/1998 | Majima | 398/95 |
| 5,838,488 A | | 11/1998 | Kobayashi | 359/341 |
| 5,880,874 A | * | 3/1999 | Shibuya et al. | 359/337 |
| 6,008,935 A | * | 12/1999 | Fujita et al. | 359/341.4 |
| 6,115,156 A | | 9/2000 | Otani et al. | 359/124 |
| 6,204,959 B1 | * | 3/2001 | Fujita et al. | 359/337.2 |
| 6,466,345 B1 | * | 10/2002 | Bousselet et al. | 398/87 |

FOREIGN PATENT DOCUMENTS

| | | |
|---|---|---|
| EP | 0612164 | 8/1994 |
| EP | 0805571 | 11/1997 |
| FR | 2756983 | 6/1998 |

(Continued)

*Primary Examiner*—Dzung Tran
(74) *Attorney, Agent, or Firm*—Staas & Halsey LLP

(57) ABSTRACT

Disclosed is an apparatus for controlling wavelength-division-multiplexed light wherein overall power of wavelength-division-multiplexed light is rendered constant through control for uniformalizing the level of only one wave of maximum power, and wherein the levels of respective channels are made substantially uniform. Optical level control means controls the optical level of propagating wavelength-division-multiplexed light, and a portion of the wavelength-division-multiplexed light output from the output level control means is branched to a tunable optical filter, which selectively outputs the light of each wavelength contained in the wavelength-division-multiplexed light. The light of each wavelength output from the optical filter is photoelectrically converted to an electric signal by photoelectric conversion means. Peak detection means detects the maximum peak value of the electric signal output from the photoelectric conversion means, and a feedback signal is input to the optical level control means in such a manner that the maximum peak value becomes a set value.

5 Claims, 11 Drawing Sheets

FOREIGN PATENT DOCUMENTS

| | | |
|---|---|---|
| JP | 6-250132 | 9/1994 |
| JP | 7-64134 | 3/1995 |
| JP | 8-163093 | 6/1996 |
| JP | 8-278523 | 10/1996 |
| JP | 9-289503 | 11/1997 |
| JP | 9-326770 | 12/1997 |
| JP | 10-173266 | 6/1998 |
| JP | 10-229237 | 8/1998 |
| JP | 10-290213 | 10/1998 |

* cited by examiner (a) INCIDENT SPECTRUM CHARACTERISTIC (b) CHANGE IN LEVEL OF RECEIVED LIGHT WITH TIME

APPARATUS FOR DETECTING PEAKS OF WAVELENGTH-DIVISION-MULTIPLEXED LIGHT, AND APPARATUS FOR CONTROLLING SAID LIGHT

This application is a divisional of application Ser. No. 09/441,080, flied Nov. 16, 1999, now U.S. Pat. No. 6,873,795.

BACKGROUND OF THE INVENTION

This invention relates to an apparatus for detecting the peaks of wavelength-division-multiplexed light and an apparatus for controlling this light. More particularly, the invention relates to a peak detection apparatus for detecting the peaks of wavelength-division-multiplexed light and a control apparatus for controlling the intensity of wavelength-division-multiplexed light based upon maximum peak value.

The development of multimedia networks in recent years has been accompanied by increasing demand for information, and much greater capacity and more flexible network formation are being sought for trunk-line optical transmission systems where information is concentrated. At the present time, transmission using wavelength division multiplexing (WDM) is the most effective means of coping with system demand and has been implemented commercially mainly in North America. In such WDM transmission systems, management of the optical level of each channel in the transmission line is important, and the advantages and disadvantages of such management affect greatly the operating state of such functional devices as optical amplifiers, and this in turn changes transmission quality significantly. In WDM transmission, therefore, management of each wavelength level and S/N ratio, etc., is ultimately required in all repeater stages.

However, deploying a level detector or level controller for each wavelength at all repeater stages is inappropriate from the standpoint of reducing the cost of optical transmission systems. There is demand for the minimum necessary functions for detecting and controlling wavelength-division-multiplexed light in a simpler manner that takes cost into consideration. Various measures have been proposed heretofore from this point of view.

FIG. 17 shows an example of an apparatus for detecting wavelength-division-multiplexed light according to the prior art. Here a simple light-spectrum monitor is provided. This is an example reported in a paper (ECOC' 97, Tu3, p. 147) by K. Otsuka et al. This is a technique through which wavelength-division-multiplexed light emitted from a fiber 101 undergoes wavelength separation by a diffraction grating 102 and impinges upon a photodiode array 103 so that the level of each wavelength is detected by a photodiode. The levels of the wavelengths are detected by the minimum number of photodiodes necessary for point-to-point monitoring.

FIG. 18 illustrates a second example of an apparatus for detecting and controlling wavelength-division-multiplexed light according to the prior art. This example is reported in a paper (IEEE Photon. Tech. Lett., vol. 10, p.734, 1998) by K. Suzuki et al. In this apparatus for detecting and controlling wavelength-division-multiplexed light, first and second optical-fiber amplifiers 110, 120 for control to uniformalize optical gain are cascade-connected, a light attenuator 130 is provided between them, and a feedback circuit 140 is provided in such a manner that the intensity of output light from the second optical-fiber amplifier 120 will be rendered constant.

The first and second optical-fiber amplifiers 110, 120 respectively include rare-earth fibers, e.g., erbium-doped fibers 112, 122, for amplifying wavelength-division-multiplexed light; laser diodes (excitation light sources) 113, 123 for generating excitation light the wavelength of which is shorter than that of signal light and the energy of which is greater, and for introducing this light to the erbium-doped fibers; optical branchers 114, 124; photoreceptors (photodiodes) 115, 125 for detecting the power of the wavelength-division-multiplexed light output by the respective optical-fiber amplifiers; photoreceptors (photodiodes) 116, 126 for detecting the power of the wavelength-division-multiplexed light input to the respective optical-fiber amplifiers; and optical-gain controllers 117, 127 for inputting feedback signals to the excitation light sources 113, 123, respectively, of the respective optical-fiber amplifiers in such a manner that the power ratio (optical gain) of the input light of the respective optical-fiber amplifiers to the output light thereof will become a set gain.

The feedback circuit 140 includes a wavelength demultiplexer 141 for separating the wavelength-division-multiplexed light, which is output by the second optical-fiber amplifier, into individual wavelengths and outputting the same; photodiodes $142_1$-$142_n$ for detecting the intensities (levels) of respective wavelengths $\lambda_1$-$\lambda_n$; a maximum-value detector 143 for detecting the maximum value from among the levels of the wavelengths; and an optical-output uniformalizing controller 144 for inputting a feedback signal to the light attenuator 130 in such a manner that the optimum value will become the set value. The light attenuator 130 controls the optical level based upon the feedback signal.

In the second example of the prior art, a high output is obtained by cascade-connecting the optical-fiber amplifiers. In an optical-fiber amplifier, gain varies depending upon wavelength, though the gains of the respective wavelengths can be made uniform (the wavelength-dependence of gain can be uniformalized) by performing control to uniformalize gain. Further, since the gains of respective wavelengths can be made uniform, the levels of the respective wavelengths can also be made approximately uniform. As a result, by detecting the wavelength for which power is maximum and performing control in such a manner that this maximum value becomes the set value, it becomes possible to perform control to uniformalize the power of the output light. In other words, it becomes possible to perform control to uniformalize the power of the output light by controlling only one wave of the maximum power irrespective of the number of channels.

The second example of the prior art resembles the first example in that level is detected on a per-wavelength basis. The second example of the prior art differs from the first example in that (1) wavelength-division-multiplexed light is separated into individual wavelengths, using a wavelength demultiplexer such as an arrayed-waveguide grating (AWG), in a state in which the wavelength-division-multiplexed light is enclosed within optical fiber; (2) after the power of each channel (each wave) is detected, the maximum value of these is calculated and fed back to the light attenuator to uniformalize the power per channel; and (3) the number of wavelengths of received light is limited owing to a limitation upon the number of wavelength branches from the wavelength demultiplexer.

FIG. 19 shows a third example of an apparatus for detecting and controlling wavelength-division-multiplexed light according to the prior art. This is described in a report by Saeki, et al. (NEC *Giho*, vol. 51, no. 4, p. 45, 1998). In this apparatus for detecting and controlling wavelength-division-multiplexed light, a light circulator 150 inputs entrant wavelength-division-multiplexed light to a wavelength demultiplexer 160, which separates the wavelength-division-multiplexed light into wavelengths $\lambda_1$-$\lambda_n$ of respective channels. The thus demultiplexed wavelengths $\lambda_1$-$\lambda_n$ of the respective channels are input to photodiodes $174_1$-$174_n$ via variable light attenuators $171_1$-$171_n$, total reflection mirrors $172_1$-$172_n$ and optical branching couplers $173_1$-$173_n$, respectively. The photodiodes $174_1$-$174_n$ photoelectrically convert the input light of the respective wavelengths and feed back the resulting signals to the variable light attenuators $171_1$-$171_n$. As a result, the levels of the respective wavelengths of the respective channels are regulated individually to a fixed level.

The apparatus for detecting wavelength-division-multiplexed light shown in FIG. 17 is structurally large in size and involves an optical system. Consequently, this arrangement is not suited to an apparatus for detecting and controlling wavelength-division-multiplexed light necessary at all repeater stages.

The apparatus for detecting and controlling wavelength-division-multiplexed light according to the second example of the prior art in FIG. 18 requires a costly wavelength demultiplexer. Moreover, there is a limitation upon the number of channels into which wavelength is divided by the wavelength demultiplexer, and the apparatus cannot deal flexibly with changes in the number of channels or changes in wavelength.

The apparatus for detecting and controlling wavelength-division-multiplexed light according to the third example of the prior art in FIG. 19 performs level adjustment individually for each channel and therefore makes possible control that is highly precise. However, the costly wavelength demultiplexer is required. Moreover, a light attenuator, total reflection mirror, optical brancher and photodiode are required for each channel, as a result of which the apparatus takes on a large size. In addition, changes in the number of channels or changes in wavelength cannot be dealt with in a flexible manner.

Thus, as described above, a wide variety of methods and arrangements have been proposed for detecting and controlling wavelength-division-multiplexed light, but each of these proposals involves problems. The functions that are required of an apparatus for detecting and controlling wavelength-division-multiplexed light are as follows:

It should be possible to detect optical power per wave of light whose wavelengths are allocated to respective channels, and to perform control to uniformalize optical power (or to detect the maximum value of optical power and perform control to uniformalize the same.

It should be possible to ascertain the number of multiplexed wavelengths.

The arrangement should be independent of channel wavelength and number of multiplexed wavelengths.

The apparatus should be low in cost, small in size and simple in structure.

The conventional examples of apparatus meet some but not all of these requirements.

SUMMARY OF THE INVENTION

Accordingly, an object of the present invention is to provide an apparatus for detecting and an apparatus for controlling wavelength-division-multiplexed light in which it is possible, through a simple structure and without requiring a costly wavelength demultiplexer, and independently of the wavelength allocation of each channel (each wave) and number of multiplexed wavelengths, to control the power of output light to uniformalize the same by control of a single wave for which power is maximum, and in which it is possible to ascertain the number of multiplexed wavelengths.

According to the present invention, there is provided an apparatus for detecting the peaks of wavelength-division-multiplexed light, comprising: (1) optical branching means for branching a portion of wavelength-division-multiplexed light propagated; (2) a tunable optical filter for selectively outputting light of each wavelength of the branched wavelength-division-multiplexed light; (3) photoelectric conversion means for photoelectrically converting light output from the tunable optical filter; and (4) peak detection means for detecting the peaks of an electric signal output from the photoelectric conversion means.

In accordance with this apparatus for detecting wavelength-division-multiplexed light, a photodiode array and a wavelength demultiplexer are not used, as a result of which the apparatus is small in size and simple in structure. Moreover, there is no limitation upon the number of channels (number of multiplexed wavelengths), and it is possible to detect maximum power from among the powers of light of wavelengths contained in the wavelength-division-multiplexed light. Further, by providing periodic sweeping means, the light of each wavelength can be output periodically from the tunable optical filter, and it is possible to readily detect the peak values/maximum peak value of power of the light of each wavelength as well as the number of multiplexed wavelengths (number of channels). By cascade-connecting two or more tunable optical filters and periodically sweeping these filters synchronously, light of a wavelength having a narrow half-width can be output. This is advantageous in a case where wavelength spacing is small. By providing a light-equalizing filter on the output side of the tunable optical filter, the precision with which the optical power of each wavelength is detected can be improved and it is possible to improve the precision with which peak value and number of multiplexed wavelengths are detected.

An apparatus for controlling wavelength-division-multiplexed light according to a first aspect of the present invention comprises: (1) optical level control means for controlling the optical level of wavelength-division-multiplexed light propagated, or an optical-fiber amplifier for amplifying wavelength-division-multiplexed light propagated; (2) optical branching means for branching a portion of wavelength-division-multiplexed light output from the optical level control means or optical-fiber amplifier; (3) a tunable optical filter for selectively outputting light of each wavelength of the branched wavelength-division-multiplexed light; (4) photoelectric conversion means for photoelectrically converting light output from the tunable optical filter; (5) peak detection means for detecting the peaks of an electric signal output from the photoelectric conversion means; and (6) feedback means for inputting a feedback signal to the optical level control means or an excitation light source of the optical-fiber amplifier in such a manner that maximum peak value will become a set value.

In accordance with the apparatus for controlling wavelength-division-multiplexed light of the first aspect of the invention, a photodiode array and a wavelength demultiplexer are not used, as a result of which the apparatus is small in size and simple in structure. Moreover, it is possible to detect maximum power from among the powers of light of wavelengths contained in the wavelength-division-multiplexed light, with no limit upon the number of channels, and control can be carried out in such a manner that this maximum value becomes the set value. As a result, the power of output light can be controlled so as to be uniformalized. By cascade-connecting two or more tunable optical filters and periodically sweeping these filters synchronously, light of a wavelength having a narrow half-width can be output. Even in a case where wavelength spacing is small, the precision with which the optical level of each wavelength is detected can be improved, thereby making possible highly precise control for uniformalizing the level of output light. By providing a light-equalizing filter on the output side of the tunable optical filter, the precision with which the optical power of each wavelength is detected is improved and it is possible to perform highly precise control to uniformalize the level of output light.

Further, in dependence upon the maximum peak value, the feedback means (1) produces a feedback signal in such a manner that the maximum peak value will become the set value, or (2) produces a feedback value in such a manner that total detected power of the wavelength-division-multiplexed light becomes the set power, and inputs the feedback signal to the excitation light source of the optical-fiber amplifier. If this arrangement is adopted, control for uniformalizing the maximum value can be performed effectively even in a case where the maximum peak value exceeds the optical level of each wavelength. Further, the number of multiplexed wavelengths is detected based upon the number of peaks of the electric signal output from the photoelectric conversion means, and the set power is changed in conformity with the number of multiplexed wavelengths, thereby making possible excellent control for uniformalizing optical level.

Further, in dependence upon the maximum peak value, the feedback means (1) produces a feedback signal in such a manner that the maximum peak value will become the set value, or (2) produces a feedback value in such a manner that detected gain (power ratio of the input light of the optical-fiber amplifier to the output light thereof) becomes the set gain, and inputs the feedback signal to the excitation light source of the optical-fiber amplifier. If this arrangement is adopted, excessive gain tilt will not be caused and control for uniformalizing maximum value can be performed effectively.

An apparatus for controlling wavelength-division-multiplexed light according to a second aspect of the present invention comprises: (1) an optical-fiber amplifier for amplifying wavelength-division-multiplexed light propagated; (2) feedback means for inputting a feedback signal to an excitation light source of the optical-fiber amplifier in such a manner that optical gain, which is a power ratio of the input light of the optical-fiber amplifier to the output light thereof, becomes a set gain; (3) optical level control means for controlling the optical level of wavelength-division-multiplexed light output from the optical-fiber amplifier; (4) optical branching means for branching a portion of wavelength-division-multiplexed light output from the optical level control means; (5) a tunable optical filter for selectively outputting light of each wavelength of the branched wavelength-division-multiplexed light; (6) photoelectric conversion means for photoelectrically converting light output from the tunable optical filter; (7) peak detection means for detecting the peaks of an electric signal output from the photoelectric conversion means; and (8) feedback means for inputting a feedback signal to the optical level control means in such a manner that the maximum peak value will become a set value; the optical level control means performing optical level control based upon the feedback signal.

In accordance with the apparatus for controlling wavelength-division-multiplexed light of the second aspect of the invention, control for uniformalizing gain is performed in a gain uniformalizing controller, thereby uniformalizing the gain of each channel. As a result, control for uniformalizing maximum value is performed in a state in which the level of the light of each wavelength is approximately uniformalized. It therefore becomes possible to perform control for uniformalizing the power of output light by controlling only one wave of the maximum power without relation to the number of channels. Moreover, the level of each channel can be made uniform.

An apparatus for controlling wavelength-division-multiplexed light according to a third aspect of the present invention comprises: (1) a first optical-fiber amplifier for amplifying wavelength-division-multiplexed light propagated; (2) first feedback means for inputting a feedback signal to an excitation light source of the first optical-fiber amplifier in such a manner that optical gain, which is a power ratio of the input light of the first optical-fiber amplifier to the output light thereof, becomes a set gain; (3) optical level control means for controlling the optical level of wavelength-division-multiplexed light output from the first optical-fiber amplifier; (4) a second optical fiber amplifier for amplifying wavelength-division-multiplexed light output from the optical level control means; (5) second feedback means for inputting a feedback signal to an excitation light source of the second optical-fiber amplifier in such a manner that optical gain, which is a power ratio of the input light of the second optical-fiber amplifier to the output light thereof, becomes a set gain; (6) optical branching means for branching a portion of wavelength-division-multiplexed light output from the second optical-fiber amplifier; (7) a tunable optical filter for selectively outputting light of each wavelength of the branched wavelength-division-multiplexed light; (8) photoelectric conversion means for photoelectrically converting light output from the tunable optical filter; (9) peak detection means for detecting the peaks of an electric signal output from the photoelectric conversion means; and (10) third feedback means for inputting a feedback signal to the optical level control means in such a manner that the maximum peak value will become a set value; the optical level control means performing optical level control based upon the feedback signal.

In accordance with the apparatus for controlling wavelength-division-multiplexed light of the third aspect of the invention, it is possible to perform control for uniformalizing the power of output light by controlling only one wave of the maximum power without relation to the number of channels. Moreover, the level of each channel can be made uniform. Furthermore, it is possible to achieve a high output and multiple channels.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Apparatus for Detecting Wavelength-division-multiplexed Light (a) First Embodiment FIG. 1 is a diagram showing the construction of a first embodiment of an apparatus for detecting the peaks of wavelength-division-multiplexed light according to the present invention. The apparatus includes an optical fiber 11 through which wavelength-division-multiplexed light propagates; an optical branching coupler 12 for branching the wavelength-division-multiplexed light; a tunable optical filter 13, the center wavelength of which is variable, for selectively outputting light of each wavelength of the branched wavelength-division-multiplexed light; a photodiode (PD) 14 serving as photoelectric conversion means for photoelectrically converting light output from the tunable optical filter 13; and a peak detection circuit 15 for detecting the peak (e.g., maximum peak) of the electric signal output from the photodiode 14.

Examples of the tunable optical filter 13 are an acousto-optic tunable optical filter, an electro-optic tunable optical filter, a thermo-optic tunable optical filter, and a mechanical tunable optical filter. According to the present invention, however, the acousto-optic tunable optical filter or electro-optic tunable optical filter is ideal from the standpoint of sweep speed.

Figure 2:
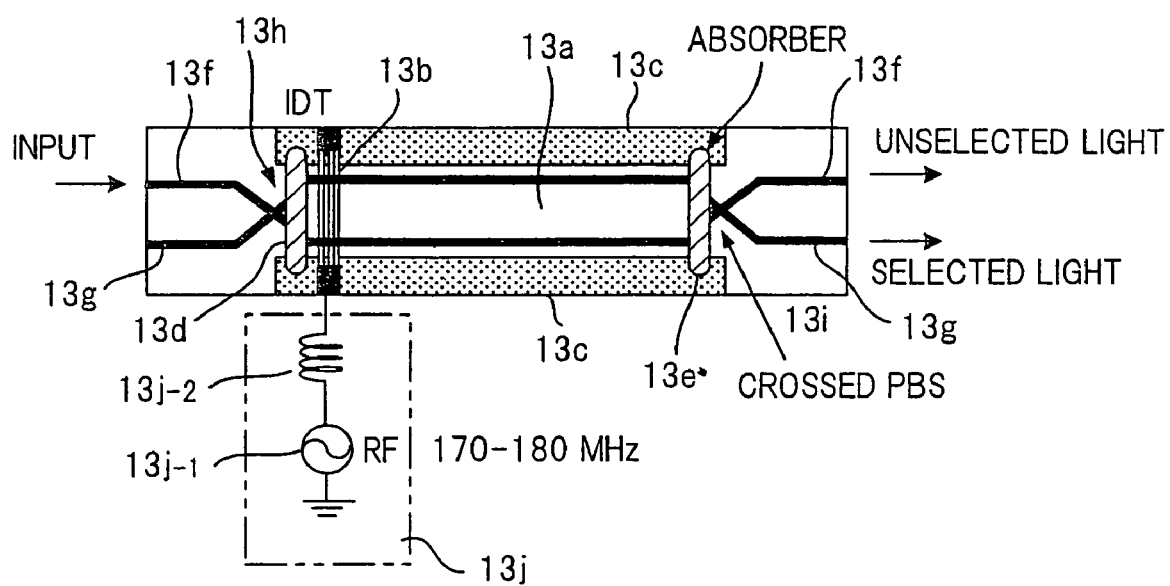
FIG. 2 is a diagram showing the construction of a tunable optical filter.

FIG. 2 is a diagram showing the construction of an acousto-optic tunable optical filter. The filter includes a SAW waveguide 13a formed on a substrate which exhibits an electro-optic effect, such as a substrate made of $LiNbO_3$ (lithium niobate); an interdigital transducer (IDT) 13b; a SAW clad 13c formed by diffusing titanium so as to clad the SAW waveguide; absorbers 13d, 13e for absorbing surface acoustic waves (SAW); optical waveguides 13f, 13g formed by diffusing titanium; crossed polarization beam splitters (PBS) 13h, 13i, which are arranged to embrace two linear waveguides, for operating independently of polarization; and a high-frequency signal application unit 13j for applying a high-frequency signal of 170-180 MHz to the interdigital transducer 13b. The high-frequency signal application unit 13j includes a high-frequency generator 13j-1 and an inductance 13j-2, which is for canceling the input capacitance of the interdigital transducer 13b, connected in series with the high-frequency generator 13j-1. When the high-frequency signal is applied to the interdigital transducer 13b, a surface acoustic wave is generated, which has the effect of rotating, by 90°, the polarization of a specific wavelength conforming to this frequency. Accordingly, the polarization beam splitters 13h, 13i are provided on the input and output sides, respectively, to split the polarization, thereby making it possible to realize a tunable optical filter. For example, if wavelength-division-multiplexed light of the TE mode is input to the tunable optical filter 13 as input light, only the polarization of the wavelength corresponding to the frequency of the high-frequency signal applied to the interdigital transducer is rotated 90°, whereby TM-mode polarization is obtained. The TM-mode polarized light is output from the optical waveguide 13g.

Figure 3:
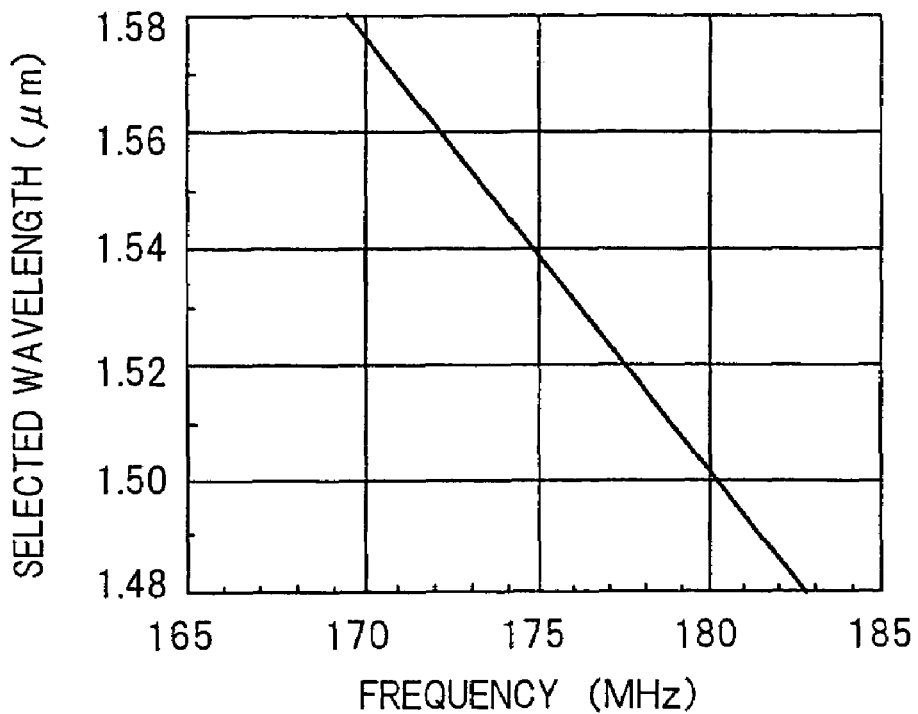
FIG. 3 is a diagram showing the tuning characteristic of the tunable optical filter.

FIG. 3 shows the tuning characteristic of the tunable optical filter. The frequency of the high-frequency signal is plotted along the horizontal axis and the selected wavelength along the vertical axis. The selected wavelength shortens in inverse proportion to the frequency of the high-frequency signal.

Accordingly, the tunable optical filter 13 is capable of selectively outputting, in successive fashion, the wavelengths contained in the input light by sweeping, at prescribed cycles, the frequency of the high-frequency signal output from the high-frequency signal application unit 13j.

Thus, when wavelength-division-multiplexed light enters the optical fiber 11, the optical branching coupler 12 branches a part of the wavelength-division-multiplexed light and inputs this light to the tunable optical filter 13. The latter sweeps the center wavelength periodically at prescribed cycles. As a result, the light of each wavelength contained in the wavelength-division-multiplexed light is separated successively and input to the photodiode 14. The latter photoelectrically converts the input light to an electric signal and applies the electric signal to the peak detection circuit 15.

Figure 4:
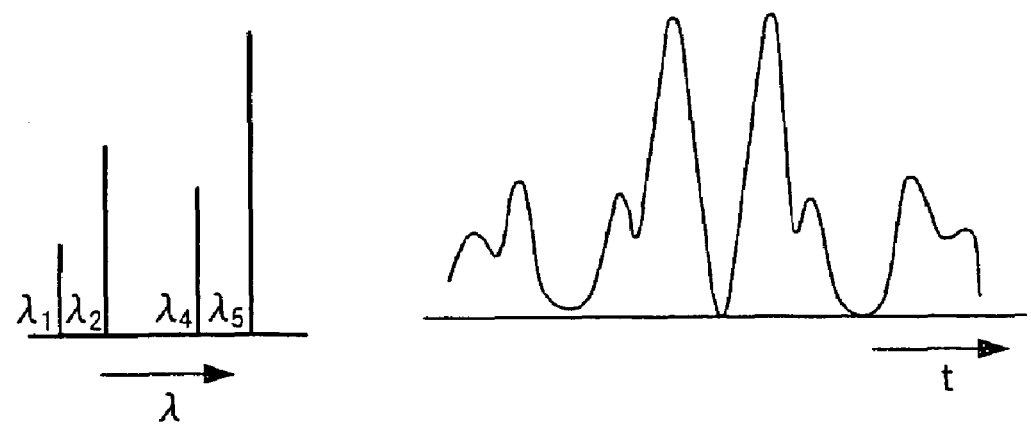
FIG. 4 is a diagram useful in describing an incidence spectrum of wavelength-division-multiplexed light and a change in the level of received light with time.

FIG. 4 is a diagram useful in describing an incidence spectrum of wavelength-division-multiplexed light and a change in the level of received light with time. Since the tunable optical filter 13 sweeps the center wavelength periodically at prescribed cycles, the optical power of the light received by the photodiode 14 indicates a change in power in which the wavelength axis is converted to the time axis. For example, if the incident light is wavelength-division-multiplexed light in which light of wavelengths $\lambda_1$, $\lambda_2$, $\lambda_4$ and $\lambda_5$ shown in FIG. 4(a) has been multiplexed, the change in level after the photoelectric conversion will be as shown in FIG. 4(b) owing to the sweeping of the center wavelength back and forth. The peak detection circuit 15 subjects the waveform of FIG. 4(b) to peak-value detection and detects the maximum peak value or each peak value and the number of peaks. The maximum peak value indicates the optical level (optical power) of the wavelength of light for which the spectrum is maximum, this light being detected from the light of a number of wavelengths contained in the wavelength-division-multiplexed light.

(b) Second Embodiment

Figure 1:
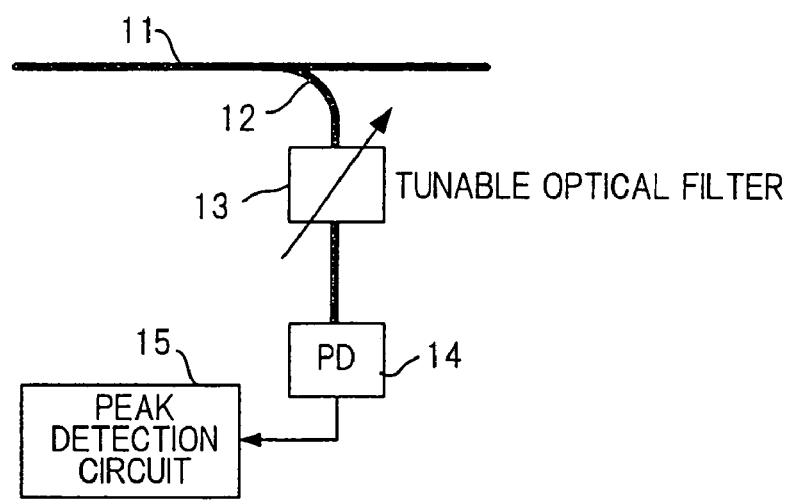
FIG. 1 illustrates a first embodiment of an apparatus for detecting the peaks of wavelength-division-multiplexed light according to the present invention.
Figure 5:
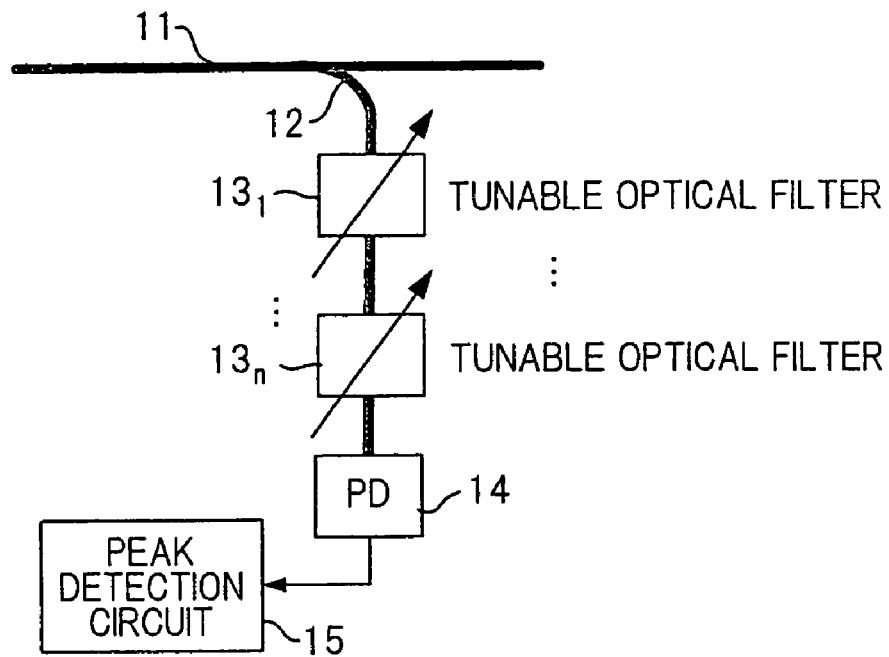
FIG. 5 illustrates a second embodiment of an apparatus for detecting the peaks of wavelength-division-multiplexed light according to the present invention.

FIG. 5 is a diagram showing the construction of a second embodiment of an apparatus for detecting the peaks of wavelength-division-multiplexed light according to the present invention. Components in FIG. 5 identical with those of the first embodiment shown in FIG. 1 are designated by like reference characters. The second embodiment differs from the first embodiment in that two or more tunable optical filters $13_1$-$13_n$ are connected in cascade, each of the tunable optical filters $13_1$-$13_n$ being swept synchronously. With only one tunable optical filter, wavelength width for which the peak value is halved (i.e., the half-width) broadens and wavelength selectivity deteriorates. If a plurality of tunable optical filters $13_1$-$13_n$ are connected in cascade, as in the second embodiment, it is possible to output light of a wavelength having a narrower half-width and to improve wavelength selectivity.

(c) Third Embodiment

Figure 6:
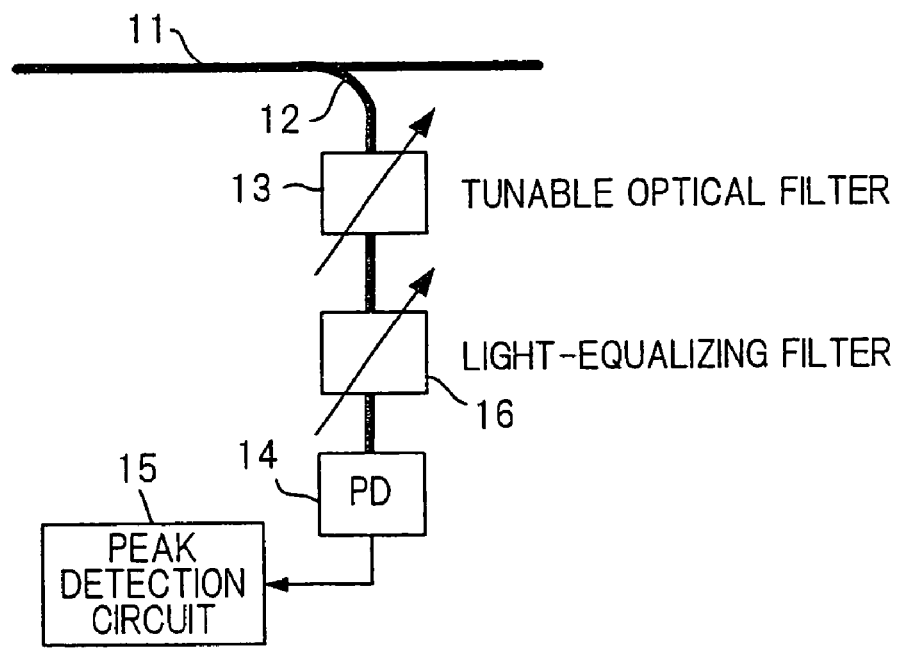
FIG. 6 illustrates a third embodiment of an apparatus for detecting the peaks of wavelength-division-multiplexed light according to the present invention.

FIG. 6 is a diagram showing the construction of a third embodiment of an apparatus for detecting the peaks of wavelength-division-multiplexed light according to the present invention. Components in FIG. 6 identical with those of the first embodiment shown in FIG. 1 are designated by like reference characters. The third embodiment differs from the first embodiment in that a light-equalizing filter 16 is provided between the tunable optical filter 13 and photodiode 14. Even if the spectrums of the wavelengths are identical, the peak values of the wavelengths output from the tunable optical filter 13 differ and accurate peak detection cannot be carried out. In the third embodiment, therefore, the output side of the tunable optical filter 13 is provided with the light-equalizing filter 16 having an equalization characteristic such that if the input spectrums are identical, the peak values of the respective wavelengths will take on the same level. As a result, peak detection and detection of maximum peak value can be performed with good precision.

(B) Apparatus for Controlling Wavelength-division-multiplexed Light

(a) First Embodiment

Figure 7:
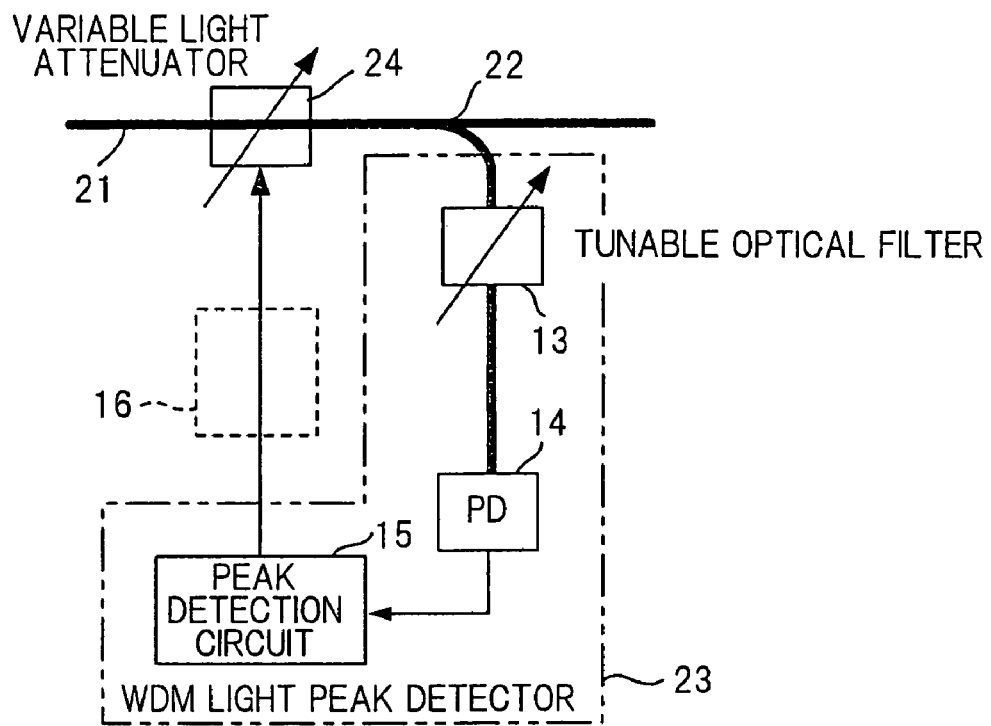
FIG. 7 illustrates a first embodiment of an apparatus for controlling wavelength-division-multiplexed light according to the present invention.

FIG. 7 is a diagram showing the construction of a first embodiment of an apparatus for controlling wavelength-division-multiplexed light according to the present invention. The apparatus includes an optical fiber 21 through which wavelength-division-multiplexed light propagates; an optical branching coupler 22 for branching the wavelength-division-multiplexed light; a wavelength-division-multiplexed light peak detector 23 for detecting the peaks of wavelength-division-multiplexed light; and a device 24, such as a variable light attenuator, for controlling the optical level of output light. Examples of the device for controlling the optical level of output light are, in addition to the variable light attenuator, an external optical modulator and a semiconductor optical amplifier.

The wavelength-division-multiplexed light peak detector 23 has a structure identical with that of the apparatus for detecting the peaks of wavelength-division-multiplexed light shown in FIG. 1. Specifically, the detector 23 includes the tunable optical filter 13, the center wavelength of which is variable, for selectively outputting light of each wavelength of the branched wavelength-division-multiplexed light; the photodiode 14 serving as photoelectric conversion means for photoelectrically converting light output from the tunable optical filter 13; and the peak detection circuit 15 for detecting the maximum peak value of the electric signal output from the photodiode 14 and inputting this value to the variable light attenuator 24.

When wavelength-division-multiplexed light enters the optical fiber 21, the optical branching coupler 22 branches a part of the wavelength-division-multiplexed light output from the variable light attenuator 24 and inputs this light to the tunable optical filter 13 of the wavelength-division-multiplexed light peak detector 23. The latter sweeps the center wavelength periodically at prescribed cycles. As a result, the light of each wavelength contained in the wavelength-division-multiplexed light is separated successively and input to the photodiode 14. The latter photoelectrically converts the input light to an electric signal and applies the electric signal to the peak detection circuit 15. The latter detects the maximum peak value, namely the optical level of the wavelength of light for which the spectrum is maximum, this light being detected from the light of a number of wavelengths contained in the wavelength-division-multiplexed light. The peak detection circuit 15 generates a feedback signal in such a manner that the maximum peak value becomes the set value and inputs this feedback signal to the variable light attenuator 24. For example, the difference between the detected maximum peak value and the set value is input to the variable light attenuator 24 as the feedback signal. The variable light attenuator 24 controls the level of the output light based upon the feedback signal. The above-described feedback control is thenceforth performed continuously so that the maximum peak value will become the set value.

It should be noted that an arrangement can be adopted in which the output side of the peak detection circuit 15 is provided with the light-equalizing filter 16 for calculating the difference between the maximum peak value and the set value and inputting the difference to the variable light attenuator 24.

To sum up the foregoing, there is obtained a temporal change in the level of received light corresponding to the spectrum of the light of each wavelength contained in the wavelength-division-multiplexed light, peak detection is carried out to detect the maximum value of the channel (the maximum peak value), and the device that controls the optical level is subjected to feedback control based upon this detected value.

If gain equalization with regard to each wavelength is performed satisfactorily, then the level error of each channel (the light of each wavelength) may be considered to be small. Further, the largest value of the output level per channel is decided mainly by the non-linearity of the optical fiber constituting the transmission line. Accordingly, control for satisfactory uniformalization of level over all channels can be carried out by detection of maximum value and control to uniformalize maximum value in the manner described above.

The foregoing relates to a case where the arrangement of FIG. 1 is used as the wavelength-division-multiplexed light peak detector 23. However, it is also possible to adopt the arrangement of FIG. 5 in which the tunable optical filters $13_1$-$13_n$ are cascade-connected, or the arrangement of FIG. 6 in which the light-equalizing filter 16 is provided on the output side of the tunable optical filter 13.

(b) Second Embodiment

Figure 8:
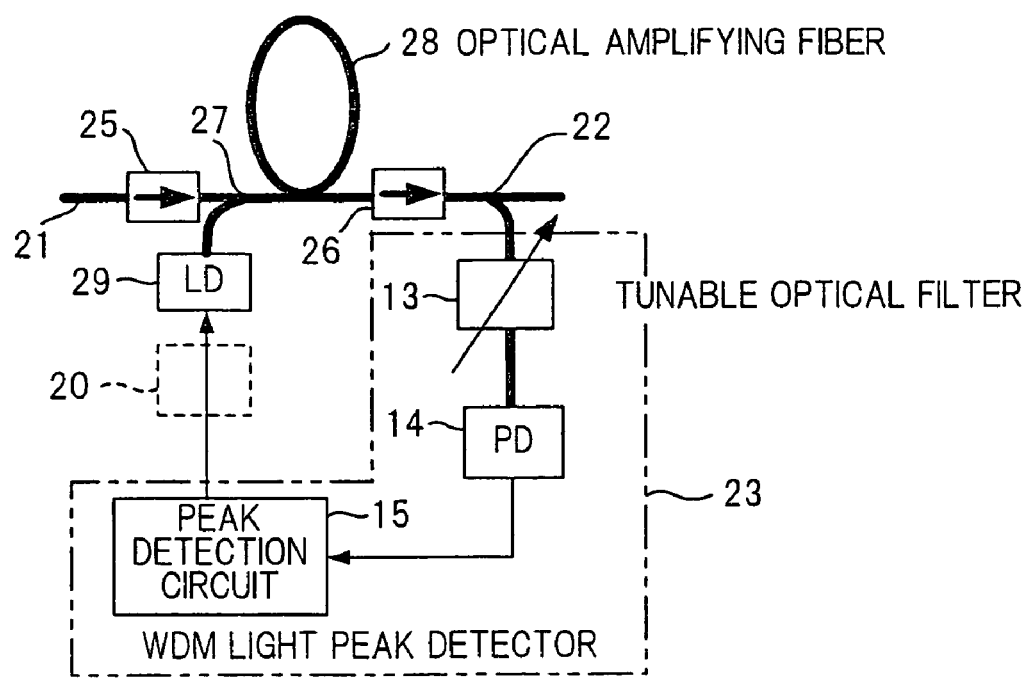
FIG. 8 illustrates a second embodiment of an apparatus for controlling wavelength-division-multiplexed light according to the present invention.

FIG. 8 is a diagram showing the construction of a third embodiment of an apparatus for controlling wavelength-division-multiplexed light according to the present invention. Components in FIG. 8 identical with those of the first embodiment shown in FIG. 7 are designated by like reference characters. The second embodiment shown in FIG. 8 differs from the first embodiment in that an optical-fiber amplifier is used instead of the variable light attenuator as means for controlling the level of the output light.

As shown in FIG. 8, there are provided optical isolators 25, 26; a wavelength multiplexing coupler 27 for multiplexing excitation light and signal light; an optical amplifying fiber 28, such as erbium-doped fiber (EDF), for amplifying signal light; and a laser diode (excitation light source) 29 for generating excitation wavelength light the wavelength of which is shorter than that of the signal light but the energy of which is greater, and inputting this light to the optical amplifying fiber 28.

Wavelength-division-multiplexed light (signal light) that has entered the optical fiber 21 passes through the optical isolator 25 and is multiplexed with the excitation wavelength light, which is emitted by the excitation light source 29, in the wavelength multiplexing coupler 27. The resulting light enters the optical amplifying fiber 28 and is amplified. The amplified wavelength-division-multiplexed light passes through the optical isolator 26 and reaches the optical branching coupler 22. The latter branches a part of the wavelength-division-multiplexed light and inputs this light to the tunable optical filter 13 of the wavelength-division-multiplexed light peak detector 23. The tunable optical filter 13 sweeps the center wavelength periodically at prescribed cycles. As a result, the light of each wavelength contained in the wavelength-division-multiplexed light is separated successively and input to the photodiode 14. The latter photoelectrically converts the power of the light of each wavelength to an electric signal and applies the electric signal to the peak detection circuit 15. The latter detects the maximum peak value, namely the optical level of the wavelength of light for which the spectrum is maximum, this light being detected from the light of a number of wavelengths contained in the wavelength-division-multiplexed light. The peak detection circuit 15 generates a feedback signal in such a manner that the maximum peak value becomes the set value and inputs this feedback signal to the excitation light source 29. The latter controls the intensity of the excitation wavelength based upon the feedback signal and controls the level of the light output from optical amplifying fiber 28. The above-described feedback control is thenceforth performed continuously so that the maximum peak value will become the set value.

It should be noted that an arrangement can be adopted in which the output side of the peak detection circuit 15 is provided with a feedback circuit 20 for calculating the difference between the maximum peak value and the set value and inputting the difference to the excitation light source 29.

In maximum-value detection and control for uniformalizing maximum value according to the second embodiment, control for satisfactory uniformalization of level over all channels can be carried out for reasons the same as those set forth in the description of the first embodiment.

The foregoing relates to a case where the arrangement of FIG. 1 is used as the wavelength-division-multiplexed light peak detector 23. However, it is also possible to adopt the arrangement of FIG. 5 in which the tunable optical filters $13_1$-$13_n$ are cascade-connected, or the arrangement of FIG. 6 in which the light-equalizing filter 16 is provided on the output side of the tunable optical filter 13.

(c) Third Embodiment

Figure 9:
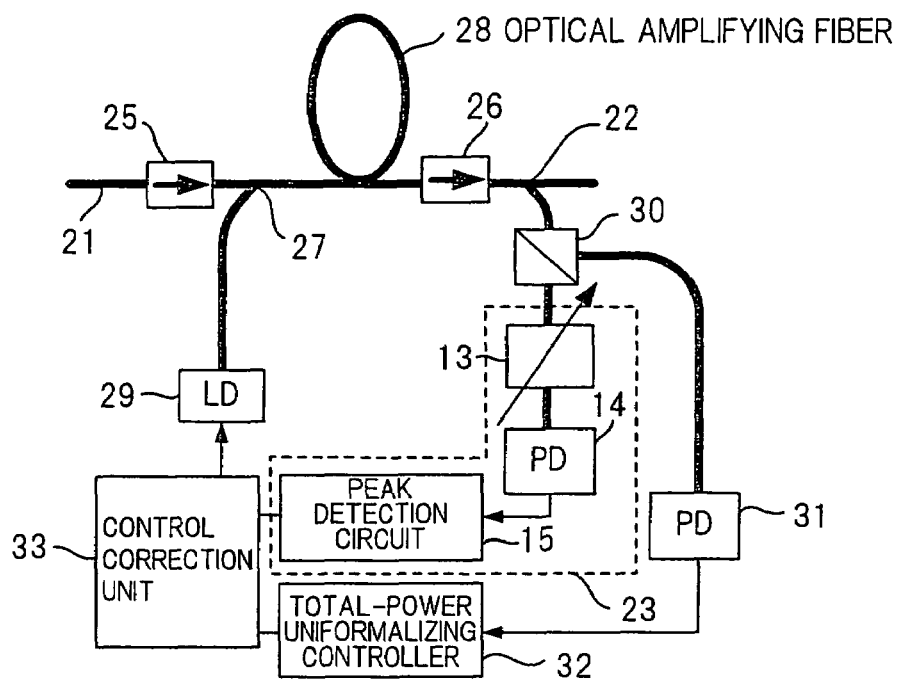
FIG. 9 illustrates a third embodiment of an apparatus for controlling wavelength-division-multiplexed light according to the present invention.

FIG. 9 is a diagram showing the construction of a third embodiment of an apparatus for controlling wavelength-division-multiplexed light according to the present invention. Components in FIG. 9 identical with those of the second embodiment shown in FIG. 8 are designated by like reference characters. The third embodiment shown in FIG. 9 differs from the second embodiment in that (1) a control loop for uniformalizing maximum value and a control loop for uniformalizing total power are provided as means for controlling the level of output light, and (2) control for uniformalizing maximum value and control for uniformalizing total power is performed appropriately based upon the difference between the maximum peak value and set peak value.

According to the first and second embodiments, control is carried out on the assumption that the level error of each channel (the light of each wavelength) is small. However, depending upon conditions, there are cases where the maximum peak value (the peak value of the light of a certain wavelength) becomes too large in comparison with the peak values of the light of the other wavelengths. In such cases the control of the first and second embodiments for uniformalizing maximum value is such that the total power is dominated by the power (the maximum peak value) of the light of the wavelength for which the excessive value has been attained. As a result, the light output cannot be uniformalized and the level difference between channels grows. Accordingly, if the maximum peak value becomes excessive, control for uniformalizing the total power of the output light is carried out to reduce the level difference between channels. If the maximum peak value is not excessive, control for uniformalizing maximum value is carried out to uniformalize the output light and level is made approximately uniform overall all channels. In other words, if $$P_0 << P_{peak} \cdot N$$

holds (where $P_0$ represents total power and $P_{peak}$ represents the detected value of the peak), then control for uniformalizing total power is performed and feedback based upon total power $P_0$ is made dominant.

The arrangement of FIG. 9 is provided with a branching coupler 30 for further branching the wavelength-division-multiplexed light branched by the optical branching coupler 22 and inputting the branched light to the control loop for uniformalizing maximum value and the control loop for uniformalizing total power; a photodiode 31 for photoelectrically converting the wavelength-division-multiplexed light to an electric signal; a total-power uniformalizing controller 32 for detecting total power of the wavelength-division-multiplexed light (output light) from the input electric signal and outputting the difference between the detected value of power and a set value of power; and a control correction unit 33 for appropriately inputting a feedback signal to the excitation light source 29 of the optical-fiber amplifier in such a manner that (1) the detected value of the peak becomes the set value of the peak or (2) the detected value of power becomes the set value of power, depending upon the difference between the detected maximum peak (detected value of the peak) and the set value of the peak.

Figure 10:
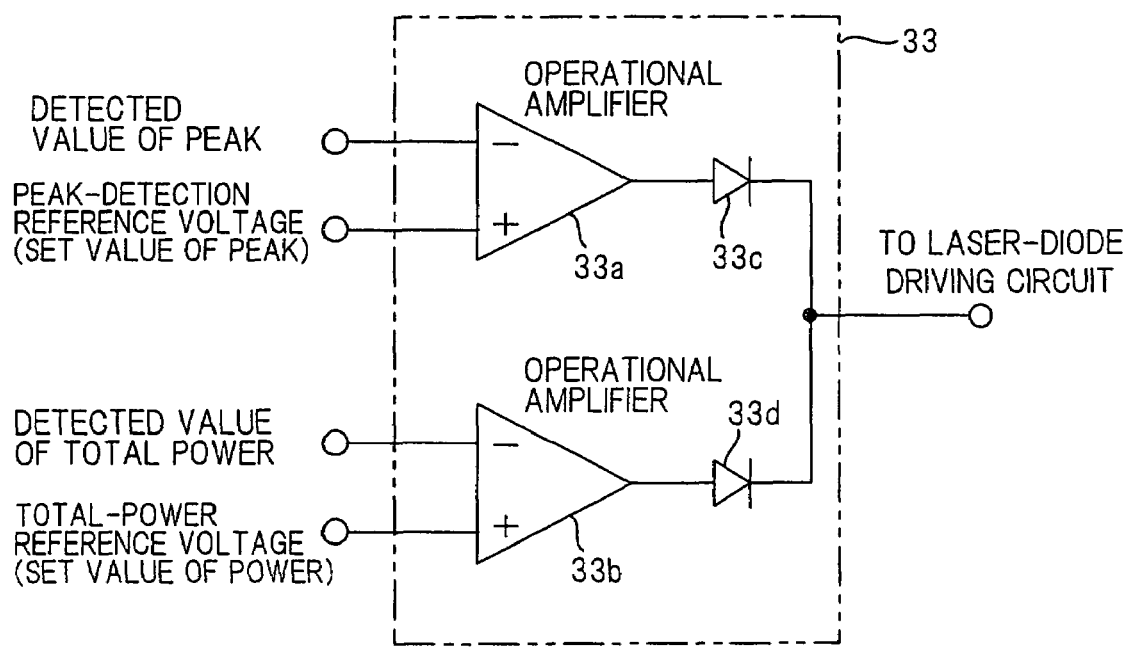
FIG. 10 is a diagram showing the construction of a control correction unit in FIG. 9.

FIG. 10 illustrates an example of the construction of the control correction unit 33, which includes an operational amplifier 33a for calculating and outputting the difference between the detected value of the peak and the set value of the peak; an operational amplifier 33b for calculating and outputting the difference between the detected value of power and the set value of power; and diodes 33c, 33e constructing diode switches and connected so as to deliver the output of whichever of the two operational amplifiers exhibits the higher level.

If the detected value of a peak becomes significantly greater than the set value of a peak, the output of the operational amplifier 33a is negative and the absolute value thereof increases. Even if the detected value of the peak increases, the variation in detected power is small and so is the absolute value of the output of the operational amplifier 33b. As a result, the output level of the operational amplifier 33b exceeds the output level of the operational amplifier 33a, the difference between the detected value of power and the set value of power is input to the excitation light source 29 as a feedback signal and control is performed so as to reduce this power difference to zero.

If the difference between the detected value of the peak and the set value of the peak is small, on the other hand, the output level of the operational amplifier 33a will exceed the output level of the operational amplifier 33b, the difference between the detected value of the peak and the set value of the peak is input to the excitation light source 29 as the feedback value and control is performed in such a manner that the detected value of the peak will become the set value of the peak.

The third embodiment described above relates to a case where the arrangement of FIG. 1 is used as the wavelength-division-multiplexed light peak detector 23. However, it is also possible to adopt the arrangement of FIG. 5 in which the tunable optical filters $13_1$-$13_n$ are cascade-connected, or the arrangement of FIG. 6 in which the light-equalizing filter 16 is provided on the output side of the tunable optical filter 13.

Figure 11:
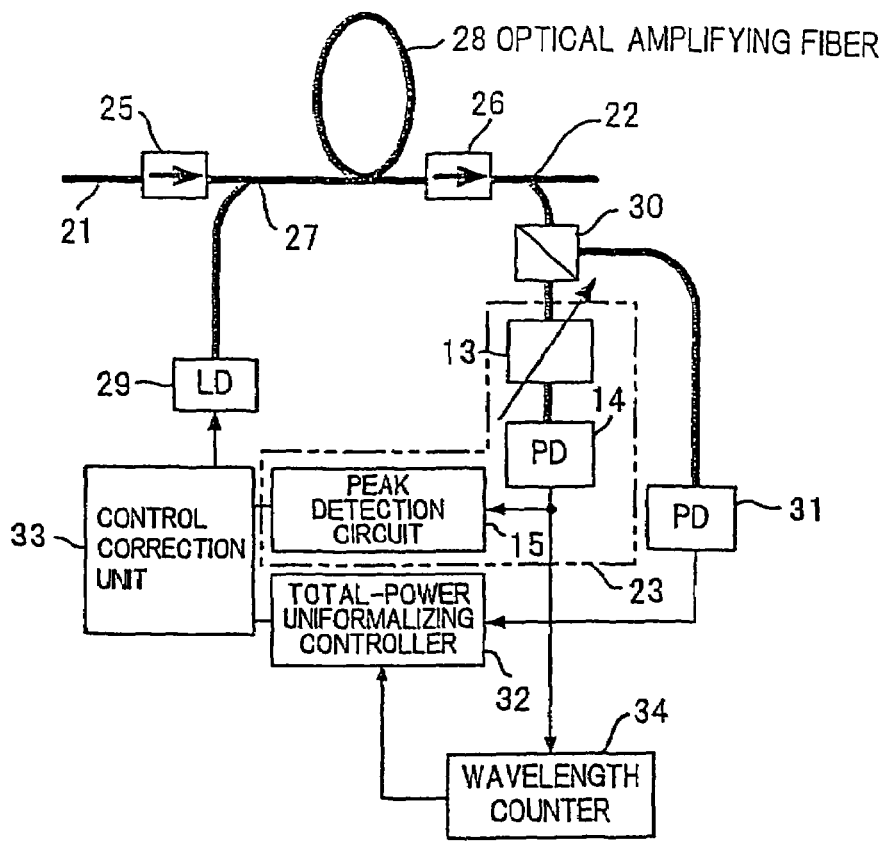
FIG. 11 illustrates a modification of the third embodiment.

Further, according to the third embodiment, the number N of channels is already known and the set value of power conforming to this number of channels is fixed. However, an arrangement can be adopted in which the number of channels is detected and the set value of power is decided in dependence upon the number of channels detected. FIG. 11 shows a modification of the third embodiment, which includes a wavelength counter 34. By counting the peaks in a waveform of the kind shown in FIG. 4(b), a count of the light of the wavelengths contained in the wavelength-division-multiplexed light is obtained. More specifically, when the output signal of the photodiode 14 exceeds a predetermined threshold value, "1" is recognized at the TTL level, counting is performed at the rising edge thereof, and the value of the count recorded in the sweeping half-period of the tunable optical filter 13 is input to the total-power uniformalizing controller 32 as the count.

(d) Fourth Embodiment

Figure 12:
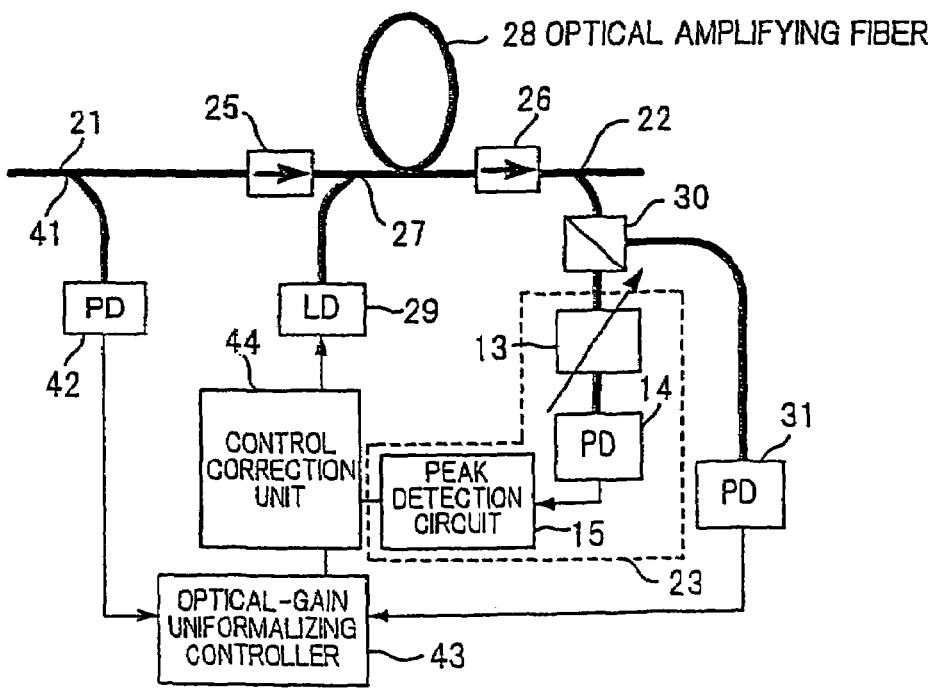
FIG. 12 illustrates a fourth embodiment of an apparatus for controlling wavelength-division-multiplexed light according to the present invention.

FIG. 12 is a diagram showing the construction of a fourth embodiment of an apparatus for controlling wavelength-division-multiplexed light according to the present invention. Components in FIG. 12 identical with those of the second embodiment shown in FIG. 8 are designated by like reference characters. The fourth embodiment shown in FIG. 12 differs from the second embodiment in that (1) a control loop for uniformalizing maximum value and a control loop for uniformalizing gain are provided as means for controlling the level of output light, and (2) control for uniformalizing maximum value and control for uniformalizing gain is performed appropriately based upon the difference between the maximum peak value and set peak value.

According to the first and second embodiments, control is carried out on the assumption that the level error of each channel (the light of each wavelength) is small. However, depending upon conditions, there are cases where the maximum peak value (the peak value of the light of a certain wavelength) becomes too large in comparison with the peak values of the light of the other wavelengths. In such cases the control of the first and second embodiments for uniformalizing maximum value is such that the total power is dominated by the power (the maximum peak value) of the light of the wavelength for which the excessive value has been attained. As a result, the light output cannot be uniformalized and the level difference between channels grows. Accordingly, if the maximum peak value becomes excessive, control for uniformalizing gain is carried out to approximately uniformalize the gains of the respective channels. In other words, with an optical-fiber amplifier, gain varies in dependence upon wavelength. By performing control to uniformalize gain, however, the gains of the respective wavelengths can be made uniform (the dependence of gain upon wavelength can be uniformalized). If the gains of respective wavelengths become uniform, the level difference between channels becomes small. If the maximum peak value is no longer excessive as a result, control for uniformalizing the maximum value is carried to make the levels across all channels approximately uniform. If such an expedient is adopted, control for uniformalizing maximum value can be performed effectively by monitoring optical gain without causing excessive gain tilt with respect to wavelength.

The arrangement of FIG. 12 is provided with the branching coupler 30 for further branching the output light (the wavelength-division-multiplexed light) branched by the optical branching coupler 22 and inputting the branched light to the control loop for uniformalizing maximum value and the control loop for uniformalizing gain; a photodiode 31 for photoelectrically converting the output light, which has been branched by the branching coupler 30, to an electric signal; an optical branching coupler 41 for branching the input light (the wavelength-division-multiplexed light); a photodiode 42 for photoelectrically converting input light, which has been branched by the branching coupler 41, to an electric signal; a gain uniformalizing controller 43 for obtaining output power and input power based upon the electric signals output from the photodiodes 31, 42, calculating optical gain from the ratio between these and outputting a signal conforming to the difference between detected gain and set gain; and a control correction unit 44 for appropriately inputting a feedback signal to the excitation light source 29 of the optical-fiber amplifier in such a manner that (1) the detected value of the peak becomes the set value of the peak or (2) the detected value of optical gain becomes the set value of optical gain, depending upon the difference between the detected maximum peak (detected value of the peak) and the set value of the peak.

Figure 13:
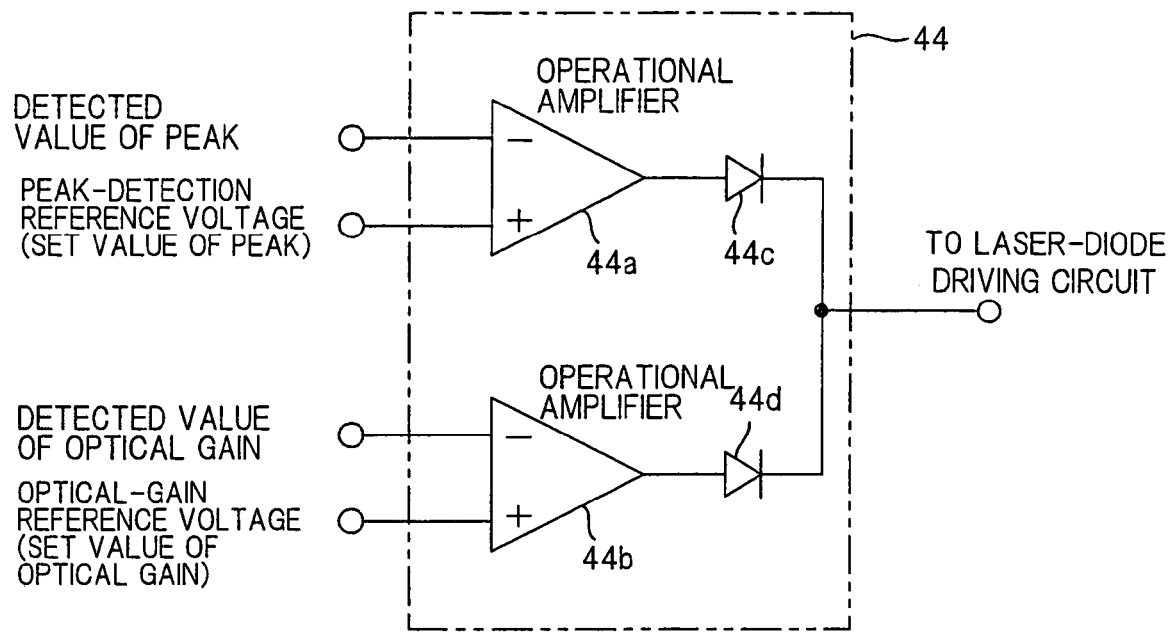
FIG. 13 is a diagram showing the construction of a control correction unit in FIG. 12.

FIG. 13 illustrates an example of the construction of the control correction unit 44, which includes an operational amplifier 44a for calculating and outputting the difference between the detected value of the peak and the set value of the peak; an operational amplifier 44b for calculating and outputting the difference between the detected value of optical gain and the set value of optical gain; and diodes 44c, 44e constructing diode switches and connected so as to deliver the output of whichever of the two operational amplifiers exhibits the higher level.

If the detected value of a peak becomes significantly greater than the set value of a peak, the output of the operational amplifier 44a is negative and the absolute value thereof increases. Even if the detected value of the peak increases, the variation in detected gain is small and so is the absolute value of the output of the operational amplifier 44b. As a result, the output level of the operational amplifier 44b exceeds the output level of the operational amplifier 44a, the difference between the detected value of optical gain and the set value of optical gain is input to the excitation light source 29 as a feedback signal and control is performed in such a manner that optical gain will be uniformalized.

If the difference between the detected value of the peak and the set value of the peak is small, on the other hand, the output level of the operational amplifier 44a will exceed the output level of the operational amplifier 44b, the difference between the detected value of the peak and the set value of the peak is input to the excitation light source 29 as the feedback value and control is performed in such a manner that the detected value of the peak will become the set value of the peak.

The fourth embodiment described above relates to a case where the arrangement of FIG. 1 is used as the wavelength-division-multiplexed light peak detector 23. However, it is also possible to adopt the arrangement of FIG. 5 in which the tunable optical filters $13_1$-$13_n$ are cascade-connected, or the arrangement of FIG. 6 in which the light-equalizing filter 16 is provided on the output side of the tunable optical filter 13.

(e) Fifth Embodiment

Figure 14:
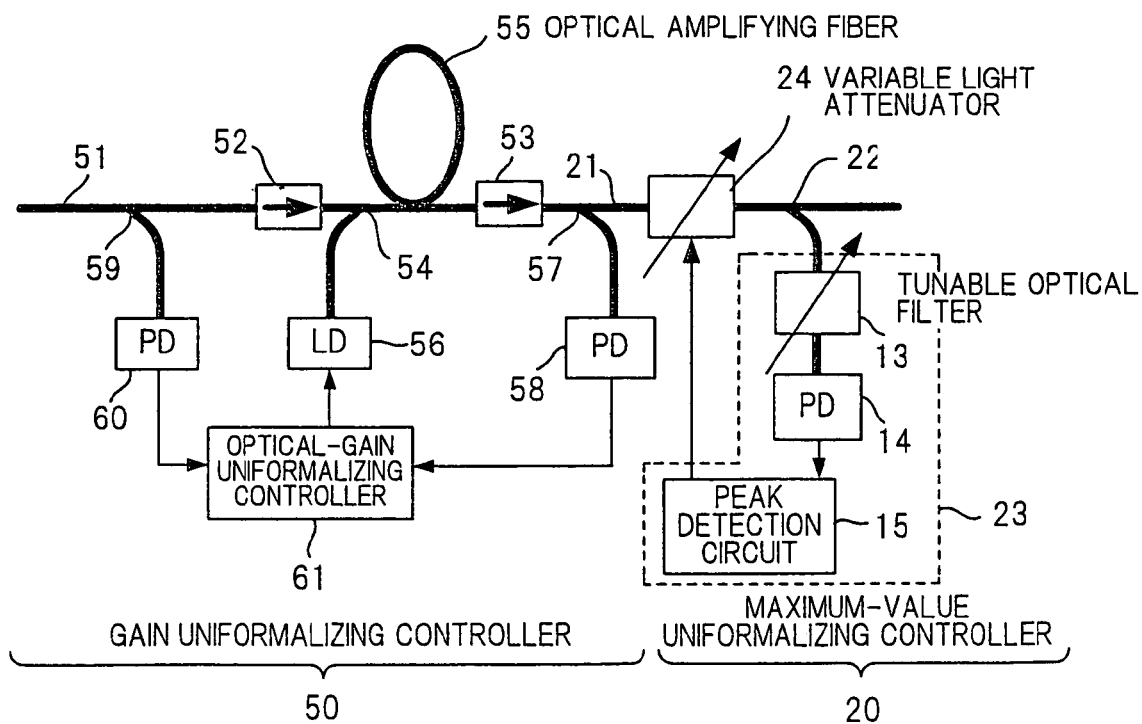
FIG. 14 illustrates a fifth embodiment of an apparatus for controlling wavelength-division-multiplexed light according to the present invention.

FIG. 14 is a diagram showing the construction of a fifth embodiment of an apparatus for controlling wavelength-division-multiplexed light according to the present invention. This is an example in which an optical-fiber amplifier for control to uniformalize gain is provided on the input side of the apparatus for controlling wavelength-division-multiplexed light according to the first embodiment (FIG. 7), and control for uniformalizing gain is performed independently of control for uniformalizing maximum value.

The arrangement of FIG. 14 includes a maximum-value uniformalizing controller 20 and an optical-gain uniformalizing controller 50. The maximum-value uniformalizing controller 20, which is for uniformalizing maximum peak value, has a structure identical with that of the apparatus for controlling wavelength-division-multiplexed light according to the first embodiment (FIG. 7). This includes the optical fiber 21 through which wavelength-division-multiplexed light propagates; the optical branching coupler 22 for branching the wavelength-division-multiplexed light; the wavelength-division-multiplexed light peak detector 23 for detecting the peaks of wavelength-division-multiplexed light; and the variable light attenuator 24 for controlling the optical level of output light. The wavelength-division-multiplexed light peak detector 23 includes the tunable optical filter 13, the photodiode 14 serving as photoelectric conversion means, and the peak detection circuit 15.

The optical-gain uniformalizing controller 50, which is for uniformalizing the ratio between the output level of the optical-fiber amplifier and the input level thereto (i.e., the gain), includes an optical fiber 51; optical isolators 52, 53; a wavelength multiplexing coupler 54 for multiplexing excitation light and signal light; an optical amplifying fiber 55, such as erbium-doped fiber (EDF), for amplifying signal light; a laser diode (excitation light source) 56 for generating excitation wavelength light the wavelength of which is shorter than that of the signal light but the energy of which is greater, and inputting this light to the optical amplifying fiber 55; a branching coupler 57 for branching the output light (wavelength-division-multiplexed light) of the optical-fiber amplifier; a photodiode 58 for photoelectrically converting the output light, which has been branched by the branching coupler, to an electric signal; an optical branching coupler 59 for branching input light (wavelength-division-multiplexed light); a photodiode 60 for photoelectrically converting the input light, which has been branched by the branching coupler, to an electric signal; and a gain uniformalizing controller 61 for obtaining power of the output light and power of the input light based upon the electric signals output from the photodiodes 58, 60, detecting optical gain from the ratio between these and inputting a feedback signal, which conforms to the difference between detected gain and set gain, to the excitation light source 56.

In accordance with the fifth embodiment, control for uniformalizing gain is performed in the optical-gain uniformalizing controller 50, thereby making it possible to make the gains of the respective channels uniform. As a result, the levels of the respective channels can be made approximately uniform. Control for uniformalizing maximum value is performed in the maximum-value uniformalizing controller 20, thereby making it possible to perform control to uniformalize the power of the output light through control of only a single wave of maximum power with relation to the number of channels. Moreover, the levels (powers) of the respective channels can be made uniform.

Further, in accordance with the fifth embodiment, control to maintain gain tilt and control of optical level per channel can be made independent of each other, and it is possible to avoid the combining of control and an increase in the complexity of control.

The fifth embodiment described above relates to a case where the arrangement of FIG. 1 is used as the wavelength-division-multiplexed light peak detector 23. However, it is also possible to adopt the arrangement of FIG. 5 in which the tunable optical filters $13_1$-$13_n$ are cascade-connected, or the arrangement of FIG. 6 in which the light-equalizing filter 16 is provided on the output side of the tunable optical filter 13.

(f) Sixth Embodiment

Figure 15:
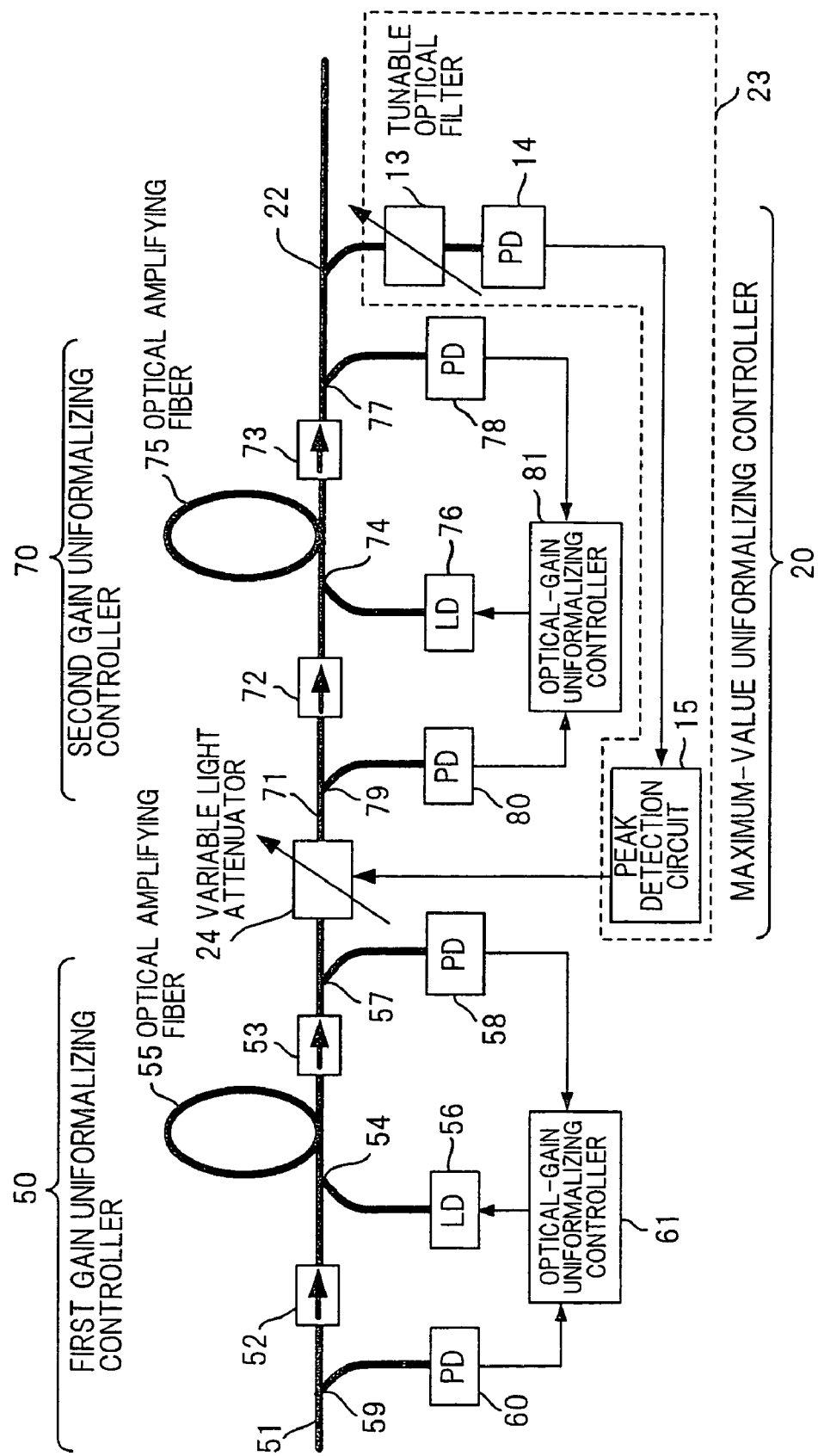
FIG. 15 illustrates a sixth embodiment of an apparatus for controlling wavelength-division-multiplexed light according to the present invention.

FIG. 15 is a diagram showing the construction of a sixth embodiment of an apparatus for controlling wavelength-division-multiplexed light according to the present invention. Components in FIG. 15 identical with those of the fifth embodiment shown in FIG. 14 are designated by like reference characters. The sixth embodiment provides a second optical-gain uniformalizing controller 70 within the maximum-value uniformalizing controller 20 of the fifth embodiment. By cascade-connecting the optical-gain uniformalizing controllers 50 and 70, a high output is obtained.

As shown in FIG. 15, the second optical-gain uniformalizing controller 70 has a structure identical with that of the first optical-gain uniformalizing controller 50 and includes an optical fiber 71; optical isolators 72, 73; a wavelength multiplexing coupler 74 for multiplexing excitation light and signal light; an optical amplifying fiber 75, such as erbium-doped fiber (EDF), for amplifying signal light; a laser diode (excitation light source) 76 for generating excitation wavelength light the wavelength of which is shorter than that of the signal light but the energy of which is greater, and inputting this light to the optical amplifying fiber 75; a branching coupler 77 for branching the output light (wavelength-division-multiplexed light) of the optical-fiber amplifier; a photodiode 78 for photoelectrically converting the output light, which has been branched by the branching coupler, to an electric signal; an optical branching coupler 79 for branching input light (wavelength-division-multiplexed light); a photodiode 80 for photoelectrically converting the input light, which has been branched by the branching coupler, to an electric signal; and a gain uniformalizing controller 81 for obtaining power of the output light and power of the input light based upon the electric signals output from the photodiodes 78, 80, detecting optical gain from the ratio between these and inputting a feedback signal, which conforms to the difference between detected gain and set gain, to the excitation light source 76.

In accordance with the sixth embodiment, control for uniformalizing gain is performed in the gain uniformalizing controllers 50 and 70, thereby making it possible to make the gains of the respective channels uniform to that the levels of the respective wavelengths can be made approximately uniform. Control for uniformalizing maximum value is performed in a state in which the level of the light of each wavelength is approximately uniformalized. It therefore becomes possible to perform control for uniformalizing the power of output light by controlling only one wave of the maximum power without relation to the number of channels. Moreover, the level (power) of each channel can be made uniform. Further, in accordance with the sixth embodiment, it is possible to achieve a high output and multiple channels. Furthermore, by placing the variable light attenuator 24 between the optical-fiber amplifiers, deterioration of the S/N ratio owing to the presence of this variable light attenuator is mitigated and it is possible to suppress a decline in excitation efficiency.

The sixth embodiment described above relates to a case where the arrangement of FIG. 1 is used as the wavelength-division-multiplexed light peak detector 23. However, it is also possible to adopt the arrangement of FIG. 5 in which the tunable optical filters 13₁-13ₙ are cascade-connected, or the arrangement of FIG. 6 in which the light-equalizing filter 16 is provided on the output side of the tunable optical filter 13.

(g) Seventh Embodiment

Figure 16:
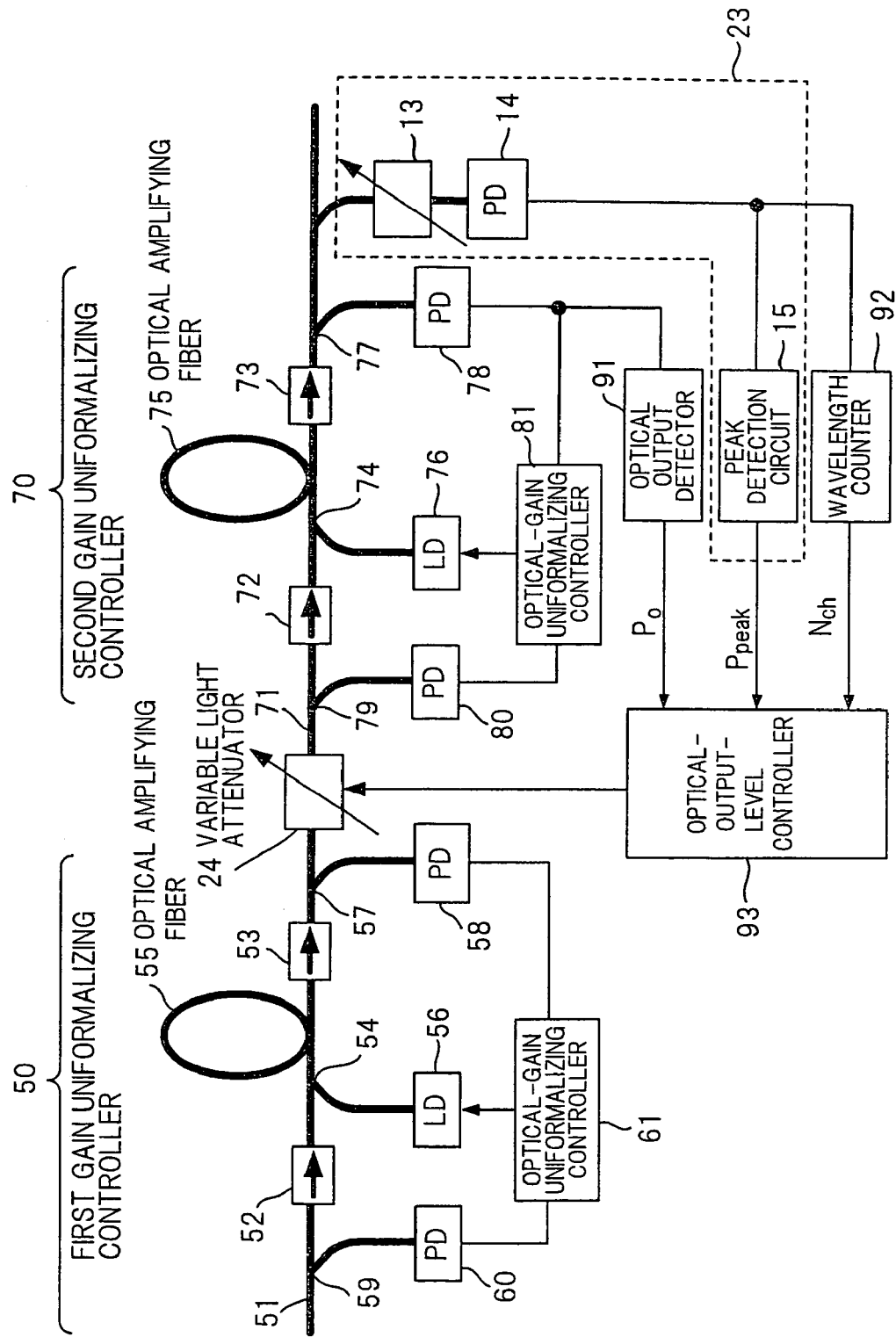
FIG. 16 illustrates a seventh embodiment of an apparatus for controlling wavelength-division-multiplexed light according to the present invention.
Figure 17:
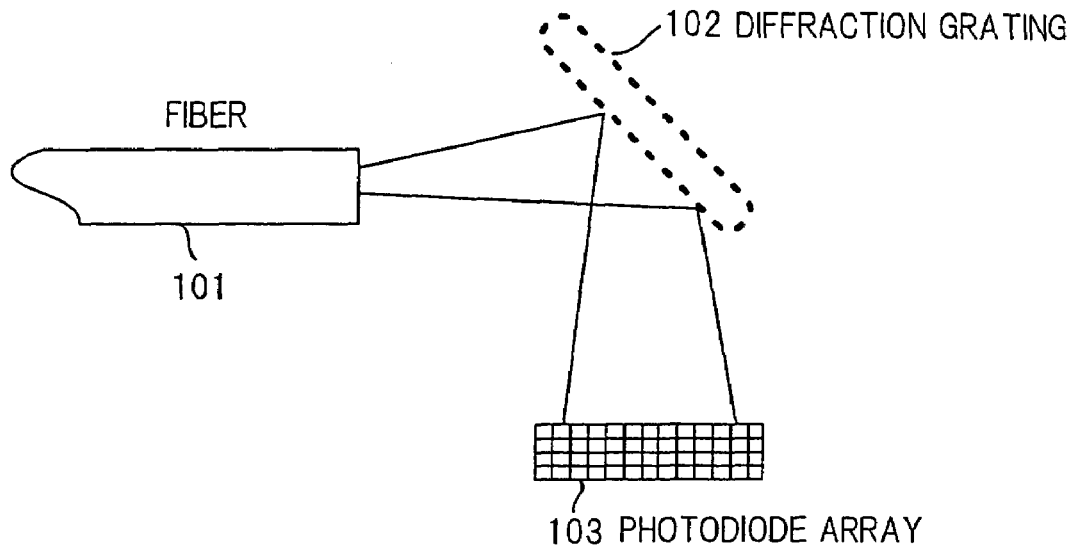
FIG. 17 is a diagram useful in describing an apparatus for detecting wavelength-division-multiplexed light according to the prior art.
Figure 19:
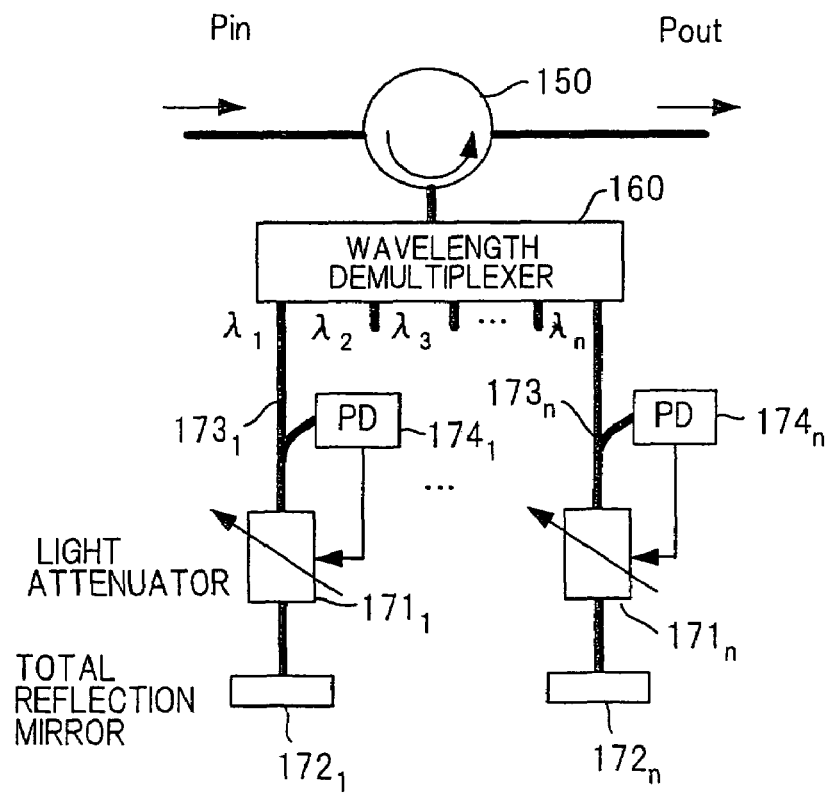
FIG. 19 is a diagram showing the construction of another example of an apparatus for detecting/controlling wavelength-division-multiplexed light according to the prior art.
Figure 18:
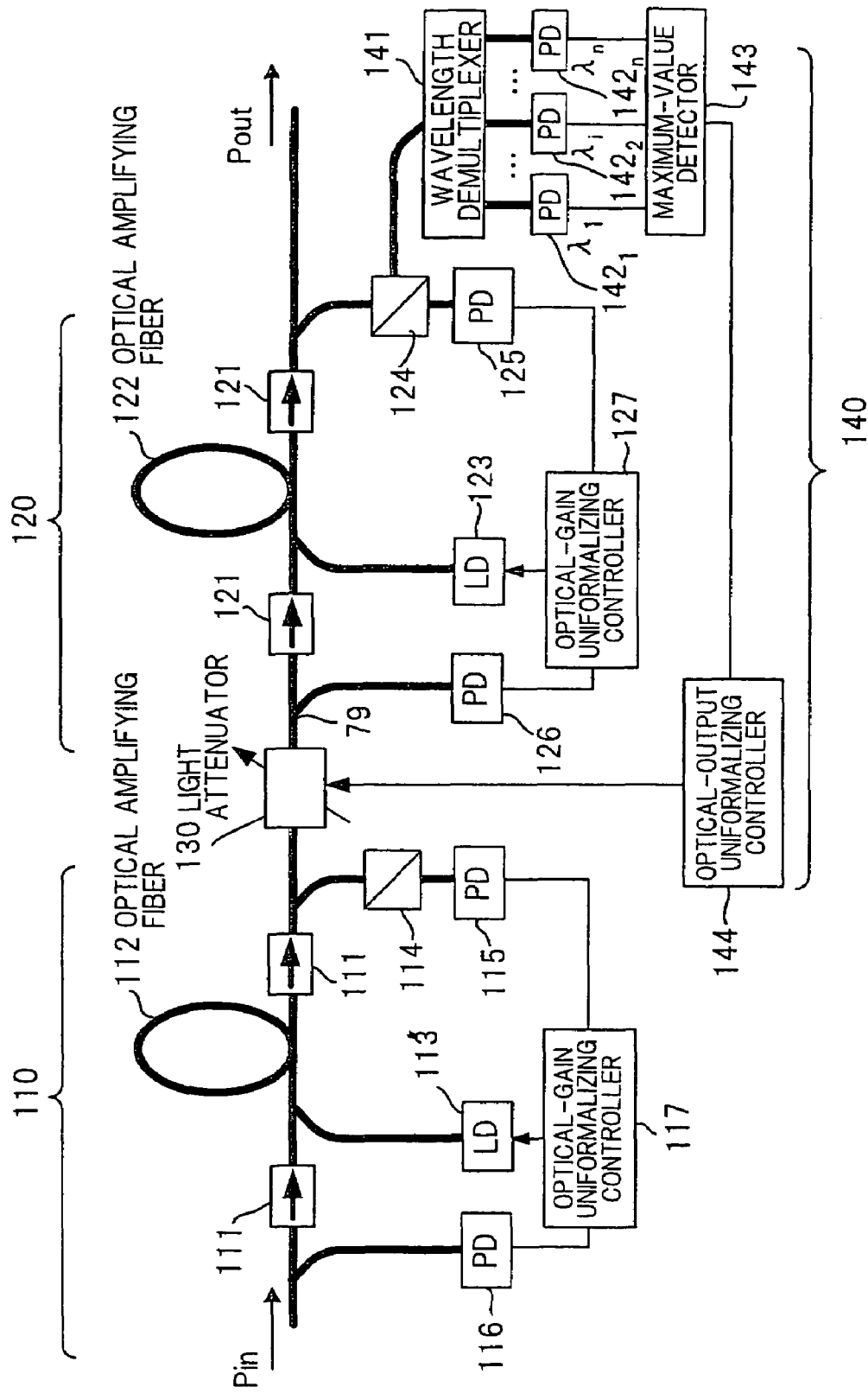
FIG. 18 is a diagram showing the construction of an apparatus for detecting/controlling wavelength-division-multiplexed light according to the prior art.

FIG. 16 is a diagram showing the construction of a seventh embodiment of an apparatus for controlling wavelength-division-multiplexed light according to the present invention. Components in FIG. 16 identical with those of the sixth embodiment shown in FIG. 15 are designated by like reference characters. The seventh embodiment shown in FIG. 16 differs from the sixth embodiment in that (1) a control loop for uniformalizing maximum value and a control loop for uniformalizing total power are provided as means for controlling the level of output light, and (2) control for uniformalizing maximum value and control for uniformalizing total power is performed based upon the value of maximum peak value $P_{peak}$.

As shown in FIG. 16, the apparatus includes an optical-power peak detection circuit 91 for detecting total power $P_0$ of the output light (wavelength-division-multiplexed light) from the electric signal output by the photodiode 78; a wavelength counter 92 for counting the peaks of the electric signal output from the photodiode 14 to thereby detect the number $N_{ch}$ of multiplexed channels; and an optical-output-level controller 93 for inputting a feedback signal to the excitation light source 29 of the optical-fiber amplifier in such a manner that (1) the detected value of the peak becomes the set value or (2) the detected value of power becomes the set value, based upon detected value of maximum peak (detected value $P_{peak}$) and the detected value $P_0$ of power.

If $$P_0 > P_{peak} \cdot N_{ch} \quad (1)$$

holds, the optical-output-level controller 93 inputs the difference between $P_{peak} \cdot N_{ch}$ and the set power $P_s$ ($=P_s - P_{peak} \cdot N_{ch}$) to the variable light attenuator 24, and the latter controls the optical level in such a manner that the difference becomes zero. It should be noted that control for making the difference between $P_{peak} \cdot N_{ch}$ and the set power $P_s$ equal to zero means performing control in such a manner that the detected peak value $P_{peak}$ becomes the set value ($=P_s/N_{ch}$). Further, if $$P_0 < P_{peak} \cdot N_{ch} \quad (2)$$

holds, the optical-output-level controller 93 inputs the difference between $P_0$ and the set power $P_s$ ($=P_s - P_0$) to the variable light attenuator 24, and the latter controls the optical level in such a manner that the difference becomes zero.

When Equation (1) holds, the number of channels is comparatively small and many ASE levels (noise levels of the optical-fiber amplifier) are included. In such cases, even if control is performed to uniformalize the detected value $P_0$ of power, the noise power contained in the light will be large and, as a consequence, true optical power cannot be controlled to achieve uniformity. Accordingly, control is carried out in such a manner that the detected peak value $P_{peak}$ becomes the set value ($=P_s/N_{ch}$). When Equation (2) holds, on the other hand, there is a possibility that the level of one channel will become excessively larger than the levels of other channels owing to gain tilt (gain tilt means that the gains of the respective wavelengths differ). In such case, even if control is performed so that the detected peak value $P_{peak}$ becomes the set value ($=P_s/N_{ch}$), the total optical power cannot be uniformalized and, moreover, the level differences between channels can be made small. Accordingly, control is performed in such a manner that the detected value $P_0$ of power is uniformalized.

The sixth embodiment described above relates to a case where the arrangement of FIG. 1 is used as the wavelength-division-multiplexed light peak detector 23. However, it is also possible to adopt the arrangement of FIG. 5 in which the tunable optical filters 13₁-13ₙ are cascade-connected, or the arrangement of FIG. 6 in which the light-equalizing filter 16 is provided on the output side of the tunable optical filter 13.

In accordance with the apparatus for detecting the peaks of wavelength-division-multiplexed light according to the present invention, a photodiode array and a wavelength demultiplexer are not used, as a result of which the apparatus is small in size and simple in structure. Moreover, there is no limitation upon the number of channels and it possible to detect the maximum value of power per wave of the wavelength-division-multiplexed light (i.e., per channel). Further, by providing periodic sweeping means, the light of each wavelength can be output periodically from a tunable optical filter, and it is possible to readily detect the peak values/maximum peak value of the light of each wavelength as well as the number of multiplexed wavelengths (number of channels). By cascade-connecting two or more tunable optical filters and periodically sweeping these filters simultaneously, light of a wavelength having a narrow half-width can be output. This is advantageous in a case where wavelength spacing is small. By providing a light-equalizing filter on the output side of the tunable optical filter, the precision with which the peak value of each wavelength is detected can be improved and it is possible to improve the precision with which peak value and number of multiplexed wavelengths are detected.

Further, in accordance with the apparatus for controlling wavelength-division-multiplexed light according to the present invention, a photodiode array and a wavelength demultiplexer are not used, as a result of which the apparatus is small in size and simple in structure. Moreover, there is no limitation upon the number of channels and it possible to detect the maximum value of power per wave of the wavelength-division-multiplexed light, and control can be carried out in such a manner that this maximum value becomes the set value. That is, in accordance with the present invention, it becomes possible to perform control to uniformalize the power of the output light by controlling only one wave of maximum power. Further, in accordance with the present invention, by cascade-connecting two or more tunable optical filters and periodically sweeping these filters simultaneously, light of a wavelength having a narrow half-width can be output. Even in a case where wavelength spacing is small, the precision with which the optical level of each wavelength is detected can be improved, thereby making possible highly precise control for uniformalizing the level of output light. Further, in accordance with the present invention, by providing a light-equalizing filter on the output side of the tunable optical filter, the precision with which the optical power of each wavelength is detected is improved and it is possible to perform highly precise control to uniformalize the level of output light.

Further, in accordance with the apparatus for controlling wavelength-division-multiplexed light according to the present invention, (1) control for uniformalizing maximum value or (2) control for uniformalizing power is performed, based upon whether or not maximum peak value that has been detected exceeds the level of the light of each wavelength. Control for uniformalizing maximum value involves generating a feedback signal in such a manner that the peak value becomes the set value. Control for uniformalizing power involves generating a feedback signal in such a manner that detected power of output light (wavelength-division-multiplexed light) becomes the set power. The feedback signal is input to an excitation light source of an optical-fiber amplifier. As a result, power can be uniformalized by control for uniformalizing power even in a case where the maximum peak value exceeds the level of the light of each wavelength. Moreover, the level difference of the light of each wavelength can be reduced and control for uniformalizing maximum value to be carried out subsequently can be performed more effectively. In addition, the number of multiplexed wavelengths is detected based upon the number of peaks of an electric signal output from photoelectric conversion means, and the set power is changed in conformity with the number of multiplexed wavelengths, thereby making possible excellent control for uniformalizing optical level.

Further, in accordance with the apparatus for controlling wavelength-division-multiplexed light according to the present invention, (1) control for uniformalizing maximum value or (2) control for uniformalizing gain is performed, based upon whether or not maximum peak value that has been detected exceeds the level of the light of each wavelength. Control for uniformalizing maximum value involves generating a feedback signal in such a manner that the peak value becomes the set value. Control for uniformalizing gain involves generating a feedback signal in such a manner that detected gain becomes the set gain. The feedback signal is input to an excitation light source of an optical-fiber amplifier. As a result, excessive gain tilt will not be caused and control for uniformalizing maximum value can be performed effectively. That is, if the maximum peak value becomes excessive, control to uniformalize gain is performed, the gains of the respective channels are made uniform and, hence, a difference in the level of the light of each wavelength can be reduced. Control for uniformalizing maximum value to be carried out subsequently can be performed more effectively.

Further, in accordance with the apparatus for controlling wavelength-division-multiplexed light according to the present invention, control for uniformalizing gain is performed in a gain uniformalizing controller, thereby uniformalizing the gain of each channel. As a result, control for uniformalizing maximum value is performed in a state in which the level of the light of each wavelength is approximately uniformalized. It therefore becomes possible to perform control for uniformalizing the power of output light by controlling only one wave of the maximum power without relation to the number of channels. Moreover, the level of each channel can be made uniform.

Further, in accordance with the present invention, it is so arranged that even in a WDM light control apparatus in which high output and multiple channels can be achieved by cascade-connecting optical-fiber amplifiers, control for uniformalizing gain is performed, thereby uniformalizing the gain of each channel. As a result, control for uniformalizing maximum value is performed in a state in which the level of the light of each wavelength is approximately uniformalized. It is possible, therefore, to perform control for uniformalizing the power of output light by controlling only one wave of the maximum power without relation to the number of channels. Moreover, the level of each channel can be made uniform. Furthermore, it is possible to achieve a high output and multiple channels. By placing a variable light attenuator between optical-fiber amplifiers, deterioration of the S/N ratio owing to the presence of this variable light attenuator is mitigated and it is possible to suppress a decline in excitation efficiency.

As many apparently widely different embodiments of the present invention can be made without departing from the spirit and scope thereof, it is to be understood that the invention is not limited to the specific embodiments thereof except as defined in the appended claims.

What is claimed is:

1. An apparatus to control wavelength-division-multiplexed light, comprising:
   an optical amplifier to amplify wavelength-division-multiplexed light;
   a tunable optical filter to selectively output light of each wavelength of a portion of the wavelength-division-multiplexed light;

peak detection means for detecting peaks of the light from said tunable optical filter;

power detection means for detecting total power of wavelength-division-multiplexed light output from the optical amplifier;

feedback means for generating a feedback signal depending on the maximum peak value, so that a maximum peak value will become a set value, or so that the detected power will become a set power, and for inputting the feedback signal to an excitation light source of the optical amplifier; and means for detecting optical gain, which is a power ratio of input light to said optical amplifier to output light from said optical amplifier;

wherein, in dependence upon the maximum peak value, said feedback means inputs a feedback signal to the excitation light source of said optical amplifier (1) in such a manner that the maximum peak value will become the set value, or (2) in such a manner that the detected optical gain will become a set gain.

2. An apparatus for controlling wavelength-division-multiplexed light, comprising:

an optical-fiber amplifier for amplifying wavelength-division-multiplexed tight;

optical level control means for controlling the optical level of wavelength-division-multiplexed light output from said optical-fiber amplifier;

a tunable optical filter for selectively outputting light of each wavelength of a portion of the wavelength-division-multiplexed light;

peak-value detection means for detecting peak values of the light output from said tunable optical filter; and feedback means for controlling said optical level control means based upon the detected peak value, wherein one or more other tunable optical filters are cascade-connected to said tunable optical filter, and each of these tunable optical filters are periodically swept synchronously.

3. An apparatus for controlling wavelength-division-multiplexed light, comprising:

a first optical-fiber amplifier for amplifying wavelength-division-multiplexed light;

optical level control means for controlling the optical level of wavelength-division-multiplexed light output from said first optical-fiber amplifier;

a second optical fiber amplifier for amplifying wavelength-division-multiplexed light output from the optical level control means;

a tunable optical filter for selectively outputting light of each wavelength of a portion of wavelength-division-multiplexed light;

peak detection means for detecting the peaks of the light output from said tunable optical filter;

feedback means for controlling said optical level control means based upon the detected peak value; and power detection means for detecting power of wavelength-division-multiplexed light output from said second optical-fiber amplifier, wherein, in dependence upon the maximum peak value, said optical level control means controls (1) in such a manner that the maximum peak value will become a set value, or (2) in such a manner that the detected power will become a set power.

4. The apparatus according to claim 3, further comprising photoelectric conversion means for photoelectrically converting light output from said tunable optical filter and means for detecting number of multiplexed wavelengths based upon number of peaks of the electric signal output from said photoelectric conversion means;

wherein the set power is changed in conformity with the number of multiplexed wavelengths.

5. An apparatus for controlling wavelength-division-multiplexed light, comprising:

a first optical-fiber amplifier for amplifying wavelength-division-multiplexed light;

optical level control means for controlling the optical level of wavelength-division-multiplexed light output from said first optical-fiber amplifier;

a second optical fiber amplifier for amplifying wavelength-division-multiplexed light output from the optical level control means;

a tunable optical filter for selectively outputting light of each wavelength of a portion of wavelength-division-multiplexed light;

peak detection means for detecting the peaks of the light output from said tunable optical filter; and feedback means for controlling said optical level control means based upon the detected peak value, wherein one or more other tunable optical filters are cascade-connected to said tunable optical filter, and each of these tunable optical filters are periodically swept synchronously.

* * * * *

UNITED STATES PATENT AND TRADEMARK OFFICE
CERTIFICATE OF CORRECTION

PATENT NO. : 7,295,780 B2  
APPLICATION NO. : 10/807287  
DATED : November 13, 2007  
INVENTOR(S) : Yasushi Sugaya It is certified that error appears in the above-identified patent and that said Letters Patent is hereby corrected as shown below:

Column 21, Line 24, change "tight;" to --light;--.

Signed and Sealed this

Sixth Day of May, 2008

JON W. DUDAS  
*Director of the United States Patent and Trademark Office*